(12) United States Patent
He et al.

(10) Patent No.: US 12,068,862 B2
(45) Date of Patent: Aug. 20, 2024

(54) METHOD FOR ENHANCED HARQ-ACK FEEDBACK IN WIRELESS COMMUNICATIONS

(71) Applicant: Apple Inc., Cupertino, CA (US)

(72) Inventors: Hong He, San Jose, CA (US); Dawei Zhang, Saratoga, CA (US); Wei Zeng, Saratoga, CA (US); Haitong Sun, Cupertino, CA (US); Yushu Zhang, Beijing (CN); Chunhai Yao, Beijing (CN); Seyed Ali Akbar Fakoorian, San Diego, CA (US); Chunxuan Ye, San Diego, CA (US); Huaning Niu, San Jose, CA (US); Oghenekome Oteri, San Diego, CA (US); Sigen Ye, Whitehouse Station, NJ (US); Weidong Yang, San Diego, CA (US); Yang Tang, San Jose, CA (US); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/441,680

(22) PCT Filed: Jan. 14, 2021

(86) PCT No.: PCT/CN2021/071815
§ 371 (c)(1),
(2) Date: Sep. 21, 2021

(87) PCT Pub. No.: WO2022/151180
PCT Pub. Date: Jul. 21, 2022

(65) Prior Publication Data
US 2023/0361938 A1     Nov. 9, 2023

(51) Int. Cl.
*H04L 1/1829*     (2023.01)
*H04W 72/11*     (2023.01)
*H04W 72/232*     (2023.01)

(52) U.S. Cl.
CPC .......... *H04L 1/1854* (2013.01); *H04L 1/1832* (2013.01); *H04W 72/11* (2023.01); *H04W 72/232* (2023.01)

(58) Field of Classification Search
CPC ... H04L 1/1854; H04L 1/1832; H04L 1/1896; H04W 72/11; H04W 72/232; H04W 72/23

See application file for complete search history.

(56) References Cited

U.S. PATENT DOCUMENTS

2020/0383105 A1    12/2020   Park et al.
2021/0314105 A1*   10/2021   Gao ..................... H04L 1/1812
(Continued)

OTHER PUBLICATIONS

International Search Report and Written Opinion directed to related International Patent Application No. PCT/CN2021/071815, mailed Oct. 14, 2021; 8 pages.

(Continued)

*Primary Examiner* — Ricky Q Ngo
*Assistant Examiner* — Kabir U Jahangir
(74) *Attorney, Agent, or Firm* — Sterne, Kessler, Goldstein & Fox P.L.L.C.

(57) ABSTRACT

Some embodiments include an apparatus, method, and computer program product for enhanced Hybrid Automatic Repeat Request (HARQ)-ACK in a fifth generation (5G) wireless communications system. A user equipment (UE) can receive, during a HARQ-ACK window, a semi-persistent scheduling (SPS) Physical Downlink Shared Channel (PDSCH) transmission or a Physical Downlink Control Channel (PDCCH) transmission corresponding to a SPS PDSCH release. The UE can generate a Hybrid Automatic (Continued)

Repeat Request (HARQ)-ACK information bit corresponding to the reception. The UE can be configured with an offset value, k, and a length, l, of the HARQ-ACK window associated with an uplink transmission slot n, of a Physical Uplink Control Channel (PUCCH) transmission, and determine a starting slot of the HARQ-ACK window as n−k. When a corresponding valid uplink transmission slot is not available, the UE can transmit the HARQ-ACK information bit in the uplink transmission slot n of the PUCCH transmission.

20 Claims, 14 Drawing Sheets

(56) References Cited

U.S. PATENT DOCUMENTS

| | | | | |
|---|---|---|---|---|
| 2022/0007399 A1* | 1/2022 | Rastegardoost | | H04L 5/0055 |
| 2022/0094483 A1* | 3/2022 | Hosseini | | H04W 72/21 |
| 2022/0103307 A1* | 3/2022 | Yang | | H04L 1/1854 |
| 2022/0132536 A1* | 4/2022 | Yang | | H04L 1/1812 |
| 2022/0183038 A1* | 6/2022 | Saber | | H04L 5/1469 |
| 2022/0399978 A1* | 12/2022 | Gao | | H04L 1/1864 |
| 2023/0112147 A1* | 4/2023 | Chien | | H04L 1/1861 |
| | | | | 370/329 |
| 2023/0155744 A1* | 5/2023 | Bae | | H04L 1/1887 |
| | | | | 370/280 |
| 2023/0247627 A1* | 8/2023 | Choi | | H04L 5/0055 |
| | | | | 370/329 |
| 2023/0276440 A1* | 8/2023 | Yang | | H04L 1/1812 |
| | | | | 370/329 |

OTHER PUBLICATIONS

3GPP 3rd Generation Partnership Project; Technical Specification Group Radio Access Network; "5G; NR; Physical Layer Procedures for Control (3GPP TS 38.213 version 16.4.0 Release 16)," 3GPP TS 38.213 V16.4.0, Jan. 8, 2021; 185 pages.

CMCC, "Discussion on DLSPS enhancements," R1-1912541, 3GPP TSG RAN WG1 #99, Reno, USA, Nov. 22, 2019; 4 pages.

* cited by examiner

METHOD FOR ENHANCED HARQ-ACK FEEDBACK IN WIRELESS COMMUNICATIONS

CROSS-REFERENCE TO RELATED APPLICATION

This application is a U.S. National Phase of International Application No. PCT/CN2021/071815, filed Jan. 14, 2021, which is hereby incorporated by reference in its entirety.

BACKGROUND

Field

The described embodiments relate generally to fifth generation (5G) wireless communication, including Hybrid Automatic Repeat Request (HARQ)-ACK signals.

Related Art 5G wireless communications systems support Enhanced Industrial Internet of Things (IoT) and ultra-reliable and low latency communications (URLLC) between a 5G Node B (gNB) and a communications device.

SUMMARY

Some embodiments in this disclosure provide a system, apparatus, method, and computer program product for enhanced Hybrid Automatic Repeat Request (HARQ)-ACK feedback to address dropped HARQ-ACK feedback corresponding to Downlink (DL) Semi-Persistent Scheduling (SPS) operations in a fifth generation (5G) wireless communications system. The embodiments satisfy the stringent latency requirements for Enhanced Industrial Internet of Things (IoT) and ultra-reliable and low latency communications (URLLC) traffic between a 5G Node B (gNB) and a communications device (e.g, a User Equipment (UE).)

A corresponding valid Uplink (UL) transmission slot may not be available for all HARQ-ACK feedback corresponding to DL SPS signals as well as SPS release signals. Some embodiments include a UE being configured to support enhanced HARQ-ACK feedback corresponding to i) SPS Physical Downlink Shared Channel (PDSCH) transmissions and/or ii) Physical Downlink Control Channel (PDCCH) transmissions for SPS PDSCH release received within a HARQ-ACK window. The enhanced HARQ-ACK feedback can be transmitted in an PUCCH transmission slot associated with the HARQ-ACK window. Some embodiments include window-based HARQ-ACK feedback relative to a PUCCH transmission where an explicit window length is provided by higher layer signaling, or where the window length is implicitly determined based on an UL transmission preparation time of the UE. Some embodiments include a window-based HARQ-ACK feedback relative to a SPS PDSCH transmission symbol/slot or PDCCH transmission symbol/slot for SPS PDSCH release.

Some embodiments include a DCI format including a HARQ-ACK Window Indicator Information Element (IE) that triggers a request for a Type-4 HARQ-ACK codebook for a dropped HARQ-ACK information bit(s) due to unavailable UL resources for PUCCH transmission. In some embodiments the Window Indicator IE supports: uniform HARQ-ACK window sizes for Carrier Aggregation (CA), and/or different HARQ-ACK window lengths according to Component Carrier (CC) groups. Some embodiments include a scheduling Downlink Control Information (DCI) format of a dynamic PDSCH transmission for HARQ-ACK retransmission.

BRIEF DESCRIPTION OF THE FIGURES

The accompanying drawings, which are incorporated herein and form part of the specification, illustrate the presented disclosure and, together with the description, further serve to explain the principles of the disclosure and enable a person of skill in the relevant art(s) to make and use the disclosure.

Figure 1:
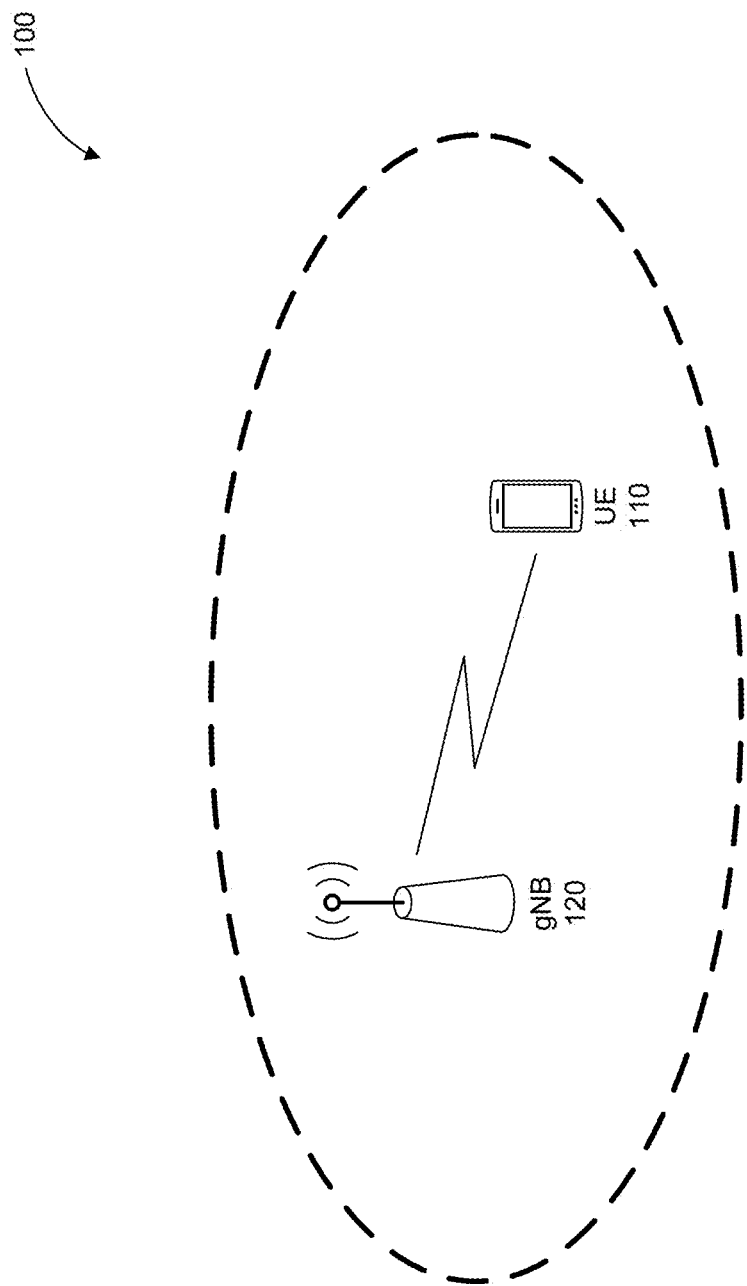
FIG. 1 illustrates an example system for enhanced Hybrid Automatic Repeat Request (HARQ)-ACK feedback, in accordance with some embodiments of the disclosure.

The presented disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Figure 14:
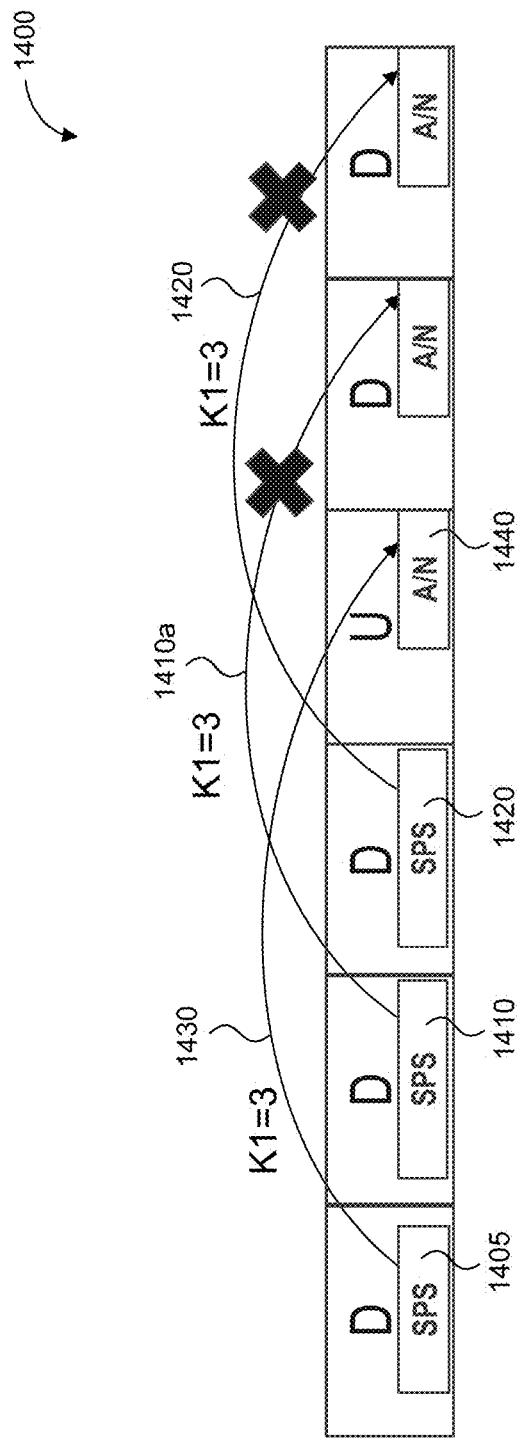
FIG. 14 illustrates an example of HARQ-ACK feedback drops corresponding to Downlink (DL) SPS PDSCH transmissions.

A fifth generation (5G) wireless communications system supports ultra-reliable and low latency communications (RLLCs) between a serving 5G Node B (gNB) and a User Equipment (UE). When Downlink (DL) Semi-Persistent Scheduling (SPS) operations are implemented, however, Hybrid Automatic Repeat Request (HARQ)-ACK feedback may be dropped. Throughout the disclosure the ACK can represent an acknowledgement (ACK) or a negative acknowledgement (NACK). This can occur, for example, due to a mismatch between SPS periodicity and semi-static Time Division Duplexing (TDD) Uplink (UL)/DL configurations. FIG. 14 illustrates example 1400 of HARQ-ACK feedback drops corresponding to DL SPS Physical Downlink Shared Channel (PDSCH) transmissions. Example 1400 illustrates a semi-static TDD UL/DL configuration where 6 slots are shown: three DL slots including SPS, an UL slot, and two DL slots. In example 1400, K1 represents a timing and/or offset indicator from a PDSCH slot to an UL slot for HARQ-ACK feedback, and in example 1400, K1=3 slots. K1 1430 shows a HARQ-ACK feedback ACK/NACK (A/N) 1440 occurring 3 slots (e.g., K1=3 slots) after the first DL slot with SPS 1405. K1 1410*a* indicates a problem because 3 slots after DL slot with SPS 1410 is a DL slot, not an UL slot, and the corresponding HARQ-ACK feedback is dropped noted by the "X". Likewise, K1 1420*a* illustrates another HARQ-ACK feedback dropped because three slots after DL slot with SPS 1420 is a DL slot. Thus, the single K1 value provided by activation DL Control Information (DCI) format or by Radio Resource Control (RRC) command does not point to a valid UL slot for all SPS PDSCH transmissions.

Some embodiments in this disclosure provide apparatus, method, and computer program product for enhanced HARQ-ACK feedback to address the dropped HARQ-ACK feedback corresponding to DL SPS signals as well as SPS release signals. The embodiments satisfy the stringent latency requirements for Enhanced Industrial Internet of Things (IoT) and ultra-reliable and low latency communications (URLLC) traffic between a gNB and a communications device.

FIG. 1 illustrates an example system 100 for enhanced HARQ-ACK feedback, in accordance with some embodiments of the disclosure. System 100 includes gNB 120 communicating with UE 110. For example, gNB 120 and UE 110 can exchange 5G communications via a semi-static TDD UL/DL configuration of UL and DL slots. In some embodiments, HARQ-ACK feedback corresponding to DL SPS signals as well as SPS release signals are transmitted from UE 110 to gNB 120.

Figure 2:
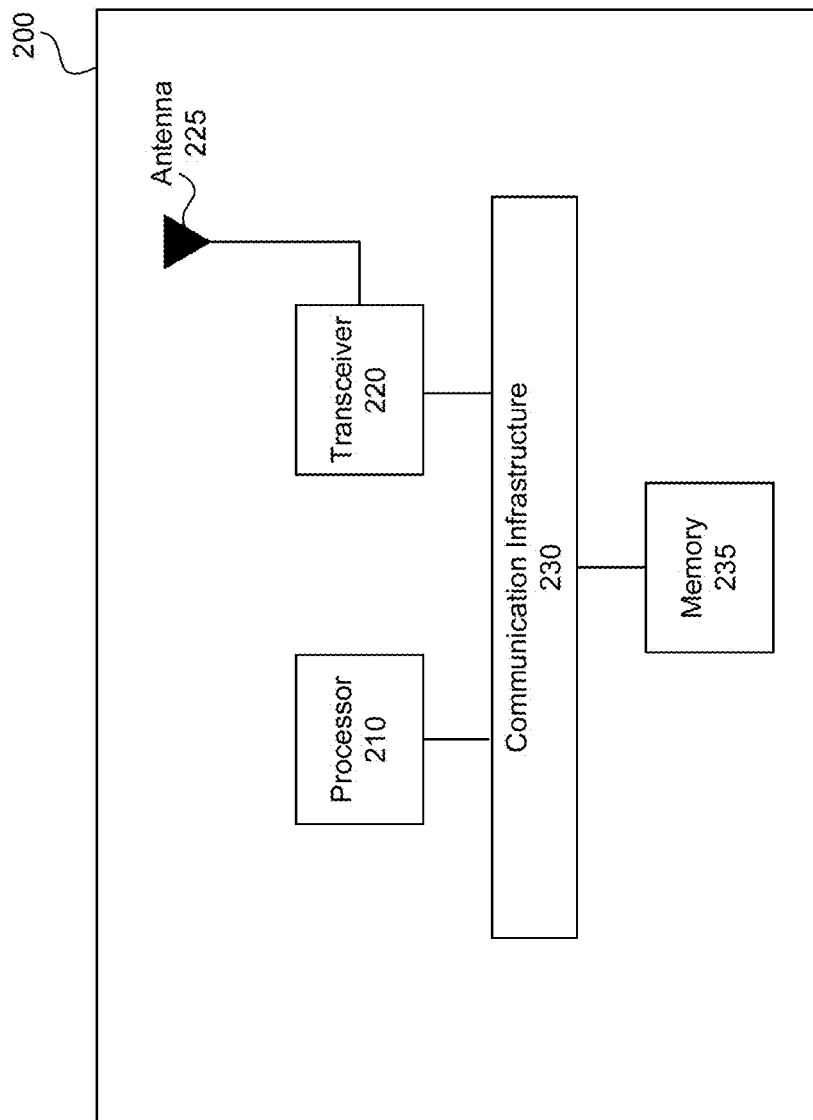
FIG. 2 illustrates a block diagram of an example wireless system for enhanced HARQ-ACK feedback, according to some embodiments of the disclosure.

FIG. 2 illustrates a block diagram of an example wireless system 200 for enhanced HARQ-ACK feedback, according to some embodiments of the disclosure. As a convenience and not a limitation, system 200, may be described with elements of FIG. 1. System 200 can be UE 110, or serving gNB 120 of FIG. 1. For example, a gNB can be a 5G base station. A UE may be a computing electronic device such as a smart phone, cellular phone, and for simplicity purposes—may include other computing devices including but not limited to laptops, desktops, tablets, personal assistants, routers, monitors, televisions, printers, and appliances. System 200 may include processor 210, transceiver 220, communication infrastructure 230, memory 235, and antenna 225 that together perform operations enabling enhanced HARQ-ACK feedback. Transceiver 220 transmits and receives 5G wireless communications signals via antenna 225. Communication infrastructure 230 may be a bus. Memory 235 may include random access memory (RAM) and/or cache, and may include control logic (e.g., computer software), computer instructions, and/or data. Processor 210, upon execution of the computer instructions, can be configured to perform the functionality described herein for enabling enhanced HARQ-ACK feedback. Alternatively, processor 210 can include its own internal memory (not shown), and/or be "hard-wired" (as in a state-machine) configured to perform the functionality described herein for enhanced HARQ-ACK feedback. Antenna 225 coupled to transceiver 220, may include one or more antennas that may be the same or different types to enable wireless communication over a wireless network.

Figure 3A:
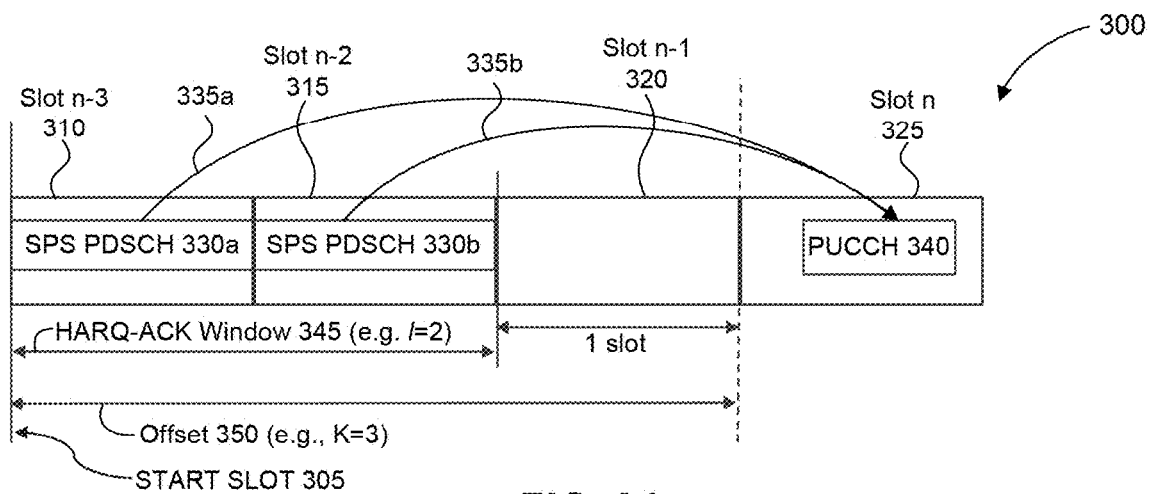
FIG. 3A illustrates an example of window-based HARQ-ACK feedback relative to a Physical Uplink Control Channel (PUCCH) transmission, according to some embodiments of the disclosure.

FIG. 3A illustrates example 300 of window-based HARQ-ACK feedback relative to a Physical Uplink Control Channel (PUCCH) transmission, according to some embodiments of the disclosure. As a convenience and not a limitation, FIGS. 3A and 3B may be described with elements of FIGS. 1 and 2. As described above, a corresponding valid UL transmission slot may not be available for all HARQ-ACK feedback corresponding to DL SPS signals as well as SPS release signals. Some embodiments include UE 110 being configured so that HARQ-ACK feedback corresponding to i) SPS PDSCH transmissions or ii) Physical Downlink Control Channel (PDCCH) transmissions for SPS PDSCH release received within a HARQ-ACK window, are transmitted in an PUCCH transmission slot associated with the HARQ-ACK window. Further, the HARQ-ACK ACK window begins at the start slot or start symbol of the SPS PDSCH transmissions and/or PDCCH transmissions for SPS PDSCH release received within the HARQ-ACK window.

In some embodiments, UE 110 can be configured with an offset value, k, via higher layer signaling (e.g., RRC command) or via an activation DCI format (e.g., activate an SPS PDSCH transmission.) UE 110 can be configured via higher layer signaling (e.g., RRC command) with length, l, of a HARQ-ACK window associated with the UL transmission slot, n, of a PUCCH transmission. To determine the start slot of the HARQ-ACK window associated with the UL transmission slot n, UE 110 determines n–k. The HARQ-ACK window length, l, is known. Thus, UE 110 can determine the SPS PDSCH transmissions or PDCCH transmissions for SPS PDSCH release received within the HARQ-ACK window associated with UL transmission slot n, and generate corresponding HARQ-ACK information bits (e.g., HARQ-ACK feedback). In some embodiments, UE 110 can multiplex the corresponding HARQ-ACK information bits into a HARQ-ACK codebook, and transmit the HARQ-ACK codebook in the PUCCH transmission (e.g., PUCCH resource) of UL transmission slot n.

Example 300 includes DL transmission slots 310, 315, 320, and UL transmission slot 325. The offset value 350 is k=3 slots and the HARQ-ACK window 345 has a length l=2 slots. UL transmission slot n, 325 includes PUCCH transmission 340. UE 110 can determine start slot 305 of HARQ-ACK window 345 by determining n−k. Based on the HARQ-ACK window length, l, and offset value 350, UE 110 can determine that SPS PDSCH transmission 330a in DL transmission slot 310 and SPS PDSCH transmission 330b in DL transmission slot 315 are within the HARQ-ACK window 345 and are associated with PUCCH transmission 340 of UL transmission slot n, 325. UE 110 can generate a first HARQ-ACK information bit corresponding to SPS PDSCH transmission 330a and a second HARQ-ACK information bit corresponding to SPS PDSCH transmission 330b. UE 110 can transmit the first and second HARQ-ACK information bits illustrated by 335a and 335b in PUCCH transmission 340 of UL transmission slot, n, 325. In some embodiments, UE 110 multiplexes the first and second HARQ-ACK information bits into a HARQ-ACK codebook, and transmits the HARQ-ACK codebook in PUCCH transmission 340 of UL transmission slot n 325.

Figure 3B:
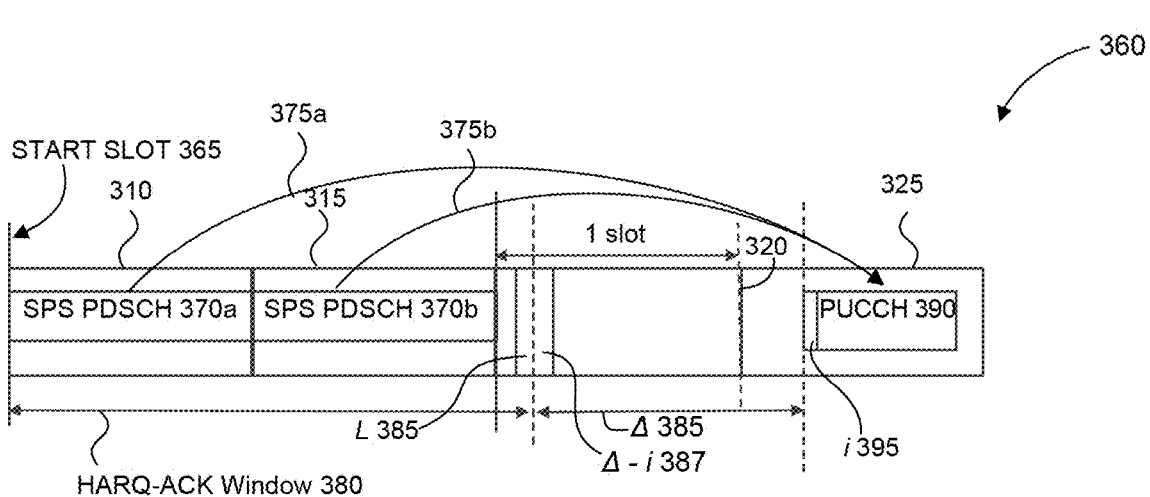
FIG. 3B illustrates another example of window-based HARQ-ACK feedback relative to a PUCCH transmission, according to some embodiments of the disclosure.

FIG. 3B illustrates another example of window-based HARQ-ACK feedback relative to a PUCCH transmission, according to some embodiments of the disclosure. As described above, a corresponding valid UL transmission slot may not be available for all HARQ-ACK feedback corresponding to DL SPS signals as well as SPS release signals. Some embodiments include UE 110 being configured so that HARQ-ACK feedback corresponding to i) SPS PDSCH transmissions or ii) PDCCH transmissions for SPS PDSCH release received within a HARQ-ACK window, are transmitted in a PUCCH transmission slot associated with the HARQ-ACK window. Further, the HARQ-ACK window begins at the start slot or start symbol of the SPS PDSCH transmissions and/or PDCCH transmissions for SPS PDSCH release received within a HARQ-ACK window.

In some embodiments, UE 110 can be configured with an offset value, k, via higher layer signaling (e.g., RRC command) or via an activation DCI format (e.g., activate an SPS PDSCH transmission.) In some embodiments, the starting slot can be determined by n−k, as with example 300, but the length, l, of a HARQ-ACK window is implicitly determined based on an UL transmission preparation time, Δ. For example, Δ can equal $T_{proc,2}$ where $T_{proc,2}$ is an UL transmission preparation time defined in Section 6.4 of 3GPP Technical Specification (TS) 38.214 for PUSCH/PUCCH transmission. The length of the HARQ-ACK window determines, for example, for which SPS PDSCH transmissions and/or PDCCH transmissions for SPS PDSCH release the UE will generate corresponding HARQ-ACK information bits that are subsequently transmitted in an associated UL transmission slot, n. For example, UE 110 can determine an ending symbol, L, of the HARQ-ACK window, where L is a last DL symbol that is earlier than symbol i-Δ, where i is a first symbol of the PUCCH transmission of UL transmission slot n, and where Δ is an UL transmission preparation time of the UE. Based at least on the ending symbol, L, UE 110 can determine, a length, l, of the HARQ-ACK window. Thus, UE 110 can determine the SPS PDSCH transmissions or PDCCH transmissions for SPS PDSCH release received within the HARQ-ACK window associated with UL transmission slot n and generate corresponding HARQ-ACK information bits (e.g., HARQ-ACK feedback). In some embodiments, UE 110 can multiplex the corresponding HARQ-ACK information bits into a HARQ-ACK codebook, and transmit the HARQ-ACK codebook in the PUCCH transmission (e.g., PUCCH resource) of UL transmission slot n.

Example 360 includes DL transmission slots 310, 315, 320, and UL transmission slot 325. UL transmission slot n, 325 includes PUCCH transmission 390. UE 110 can determine starting slot 365 of HARQ-ACK window 380 as n−k and then determine the length of a length, l, of HARQ-ACK window 380. UE 110 can determine an ending symbol, L 383, of HARQ-ACK window 380, where L 383 is a last DL symbol that is earlier than symbol i-Δ 387, where i 395 is a first symbol of PUCCH transmission 390 of UL transmission slot, n, 325 and where Δ 385 is an UL transmission preparation time of the UE. Based at least on the ending symbol, L, UE 110 can determine, a length, l, of HARQ-ACK window 380. Knowing the length of HARQ-ACK window 380, UE 110 can determine that SPS PDSCH transmissions 370a and 370b occur during HARQ-ACK window 380 associated with the UL transmission slot n, 325. UE 110 can generate a first HARQ-ACK information bit corresponding to SPS PDSCH transmission 370a and a second HARQ-ACK information bit corresponding to SPS PDSCH transmission 370b. UE 110 can transmit the first and second HARQ-ACK information bits illustrated by 375a and 375b, respectively, in PUCCH transmission 390 of UL transmission slot n, 325. In some embodiments, UE 110 multiplexes the first and second HARQ-ACK information bits into a HARQ-ACK codebook, and transmits the HARQ-ACK codebook in PUCCH transmission 390 of UL transmission slot n 325.

In some embodiments, UE 110 determines a set of X occasions for SPS PDSCH transmissions or PDCCH transmissions for SPS PDSCH release for which UE 110 can transmit corresponding HARQ-ACK information bits in a PUCCH transmission in UL transmission slot n 325. The determination can be based on configured parameters as discussed above. In some embodiments, UE 110 can exclude occasions of SPS PDSCH transmissions and/or SPS PDSCH release that are associated with earlier PUCCH occasion in i, where i is less than or equal to n, (e.g., an earlier slot 'i') and UL slots signaled by higher layer signaling (e.g., RRC command) and/or DCI format 2_0. The exclusion may minimize the HARQ-ACK codebook size and reduce PUCCH signaling overhead.

In some embodiments, the HARQ-ACK window can be determined based on the DL SPS PDSCH periodicity and semi-static slot format configuration provided by tdd-UL-DL-Configuration Common, tdd-UL-DL-Configuration-Dedicated. In some embodiments, the slot format provided by DCI Format 2_0 may be used for HARQ-ACK window determination. In some embodiments, the HARQ-ACK window for SPS PDSCH can determined such that the HARQ-ACK feedback latency is minimized. For example, the first available UL slot with a valid PUCCH resource after a SPS PDSCH(s) transmission can be used for HARQ-ACK feedback of the SPS PDSCH(s) transmission.

Figure 15:
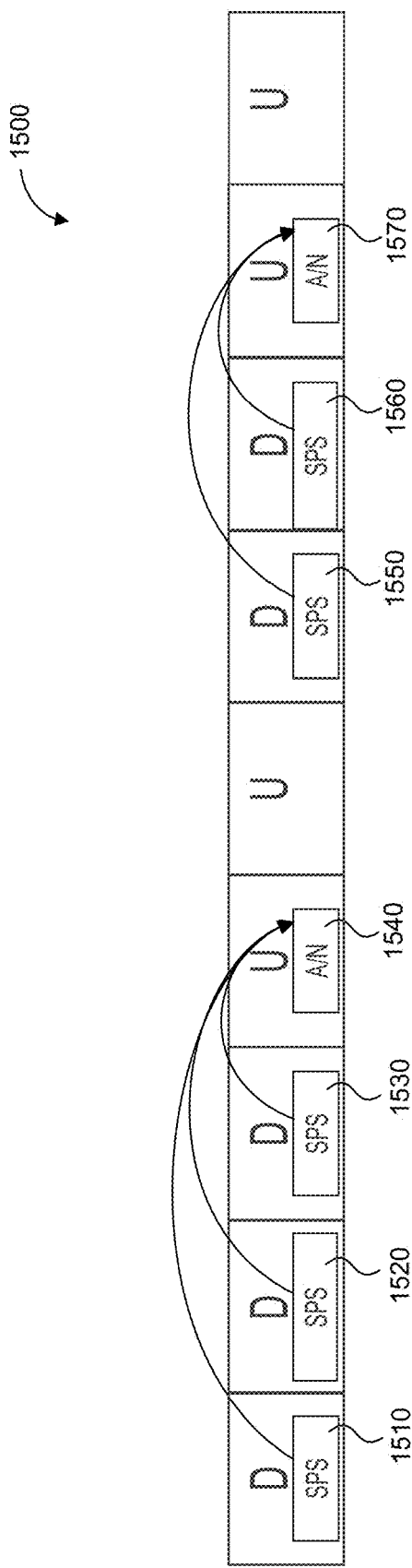
FIG. 15 illustrates an example of HARQ-ACK window determination, according to some embodiments of the disclosure.

FIG. 15 illustrates example 1500 of HARQ-ACK window determination, according to some embodiments of the disclosure. As a convenience and not a limitation, FIG. 15 may be described with elements of other figures in the disclosure. The slot formats can be provided by tdd-UL-DL-ConfigurationCommon, tdd-UL-DL-ConfigurationDedicated, and DCI Format_0 as 'DDDUUDDUU' where 'D' denotes a DL slot and 'U' denotes an UL slot. The SPS periodicity can be configured as one slot based on a latency requirement. For example, the HARQ-ACK information (e.g., ACK/NACK (A/N) 1540) for SPS PDSCH transmissions 1510, 1520, and 1530 can be reported in the first available UL slot based on the UL/DL configuration 'DDDUUDDUU'. Similarly, the HARQ-ACK information A/N 1570 for SPS PDSCH 1550 and 1560 can be reported in the first available UL slot based on the UL/DL configuration 'DDDUUDDUU'.

Figure 4:
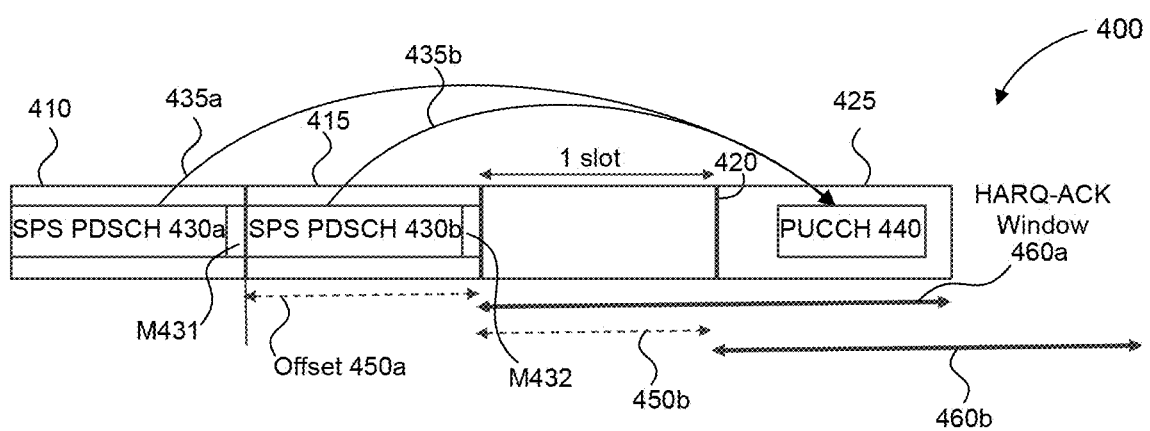
FIG. 4 illustrates an example of window-based HARQ-ACK feedback relative to a Semi-Persistent Scheduling (SPS) Physical Downlink Shared Channel (PDSCH) transmission symbol/slot or Physical Downlink Control Channel (PDCCH) transmission symbol/slot for SPS PDSCH release, according to some embodiments of the disclosure.

FIG. 4 illustrates example 400 of window-based HARQ-ACK feedback relative to a SPS PDSCH transmission symbol/slot or PDCCH transmission symbol/slot for SPS PDSCH release, according to some embodiments of the disclosure. As a convenience and not a limitation, FIG. 4 may be described with elements of FIGS. 1, 2, 3A and 3B. As described above, a corresponding valid UL transmission slot may not be available for all HARQ-ACK feedback corresponding to DL SPS signals as well as SPS release signals. In example 400, the HARQ-ACK window length may start from an end symbol or end slot, M of a SPS PDSCH transmission or PDCCH transmission for SPS PDSCH release. This is in contrast to examples 300 of FIG. 3A and example 360 of FIG. 3B where a SPS PDSCH transmission symbol/slot or PDCCH transmission symbol/slot for SPS PDSCH release are received within the HARQ-ACK window, and the HARQ-ACK window begins at the start of the SPS PDSCH transmission symbol/slot or PDCCH transmission symbol/slot for SPS PDSCH release received.

In some embodiments, UE 110 can be configured with an offset value, k, via higher layer signaling (e.g., RRC command) or via an activation DCI format (e.g., activate an SPS PDSCH transmission.) UE 110 can be configured via higher layer signaling (e.g., RRC command) with length, l, of a HARQ-ACK window associated with the UL transmission slot n, of a PUCCH transmission. The offset value, k, (e.g., a single offset value, k) indicates the starting slot or starting sub-slot in a slot within a HARQ-window relative to the end symbol/slot, M, of a SPS PDSCH transmission or PDCCH transmission for SPS PDSCH release. UE 110 can generate a corresponding HARQ-ACK information bit and transmit the HARQ-ACK information bit in the earliest PUCCH or PUSCH transmission occasion in the associated HARQ-ACK window that starts from slot M+k.

Example 400 includes DL transmission slots 410, 415, 420, and UL transmission slot 425. The offset values 450a and 450b is illustrated as k=1 slot and the HARQ-ACK window 460a and 460b have a length l=2 slots. UL transmission slot n, 425 includes PUCCH transmission 440. The offset value 450a, indicates the starting slot or starting sub-slot in a slot within HARQ-window 460a relative to the end symbol/slot of M 431 of SPS PDSCH transmission 430a. The offset value 450b, indicates the starting slot or starting sub-slot in a slot within HARQ-window 460b relative to the end symbol/slot M 432 of SPS PDSCH transmission 430b. UE 110 can generate a first HARQ-ACK information bit corresponding to SPS PDSCH transmission 430a and transmit via 435a, the first HARQ-ACK information bit in the earliest PUCCH or PUSCH transmission occasion (e.g., PUCCH transmission 440) in the associated HARQ-ACK window (HARQ-ACK window 460a) that starts from slot M 431+offset 450a. UE 110 can generate a second HARQ-ACK information bit corresponding to SPS PDSCH transmission 430b, and transmit via 435b, the second HARQ-ACK information bit in the earliest PUCCH or PUSCH transmission occasion (e.g., PUCCH transmission 440) in the associated HARQ-ACK window (HARQ-ACK window 460b) that starts from slot M 432+offset 450b. In some embodiments, UE 110 multiplexes the first and second HARQ-ACK information bits into a HARQ-ACK codebook, and transmits the HARQ-ACK codebook in PUCCH transmission 440 of UL transmission slot n 425.

In some embodiments, UE 110 may be provided a table via RRC command such as Table 1. DCI-based SPS PDSCH Activation: Offset and Window Lengths, where each row indicates a separate offset value, k, and HARQ-ACK window length, l. One of these rows can be signaled by a DL SPS activation DCI format (e.g., Type-2 SPS PDSCH) on a per SPS configuration basis. For example, gNB 120 may take into account different latency requirements of the DL SPS configuration and transmit a different index value in a DL SPS activation DCI format to UE 110. UE 110 can use the corresponding offset value, k and window length, l, accordingly to determine corresponding HARQ-ACK information bits. UE 110 can transmit the corresponding HARQ-ACK information bits in a PUCCH transmission of an UL transmission slot n.

TABLE 1

DCI-based SPS PDSCH Activation: Offset and Window Lengths

| Index | Offset Value, k | Window length, l |
|---|---|---|
| 0 | K1 | W1 |
| 1 | K2 | W2 |
| 2 | K3 | W3 |
| ... | ... | ... |

In some embodiments, UE 110 may be configured with a set of offset values, k, and the smallest k value with corresponding slot n+k is the UL used for HARQ-ACK feedback. In some embodiments, UE 110 can cycle through values of k.

Figure 5:
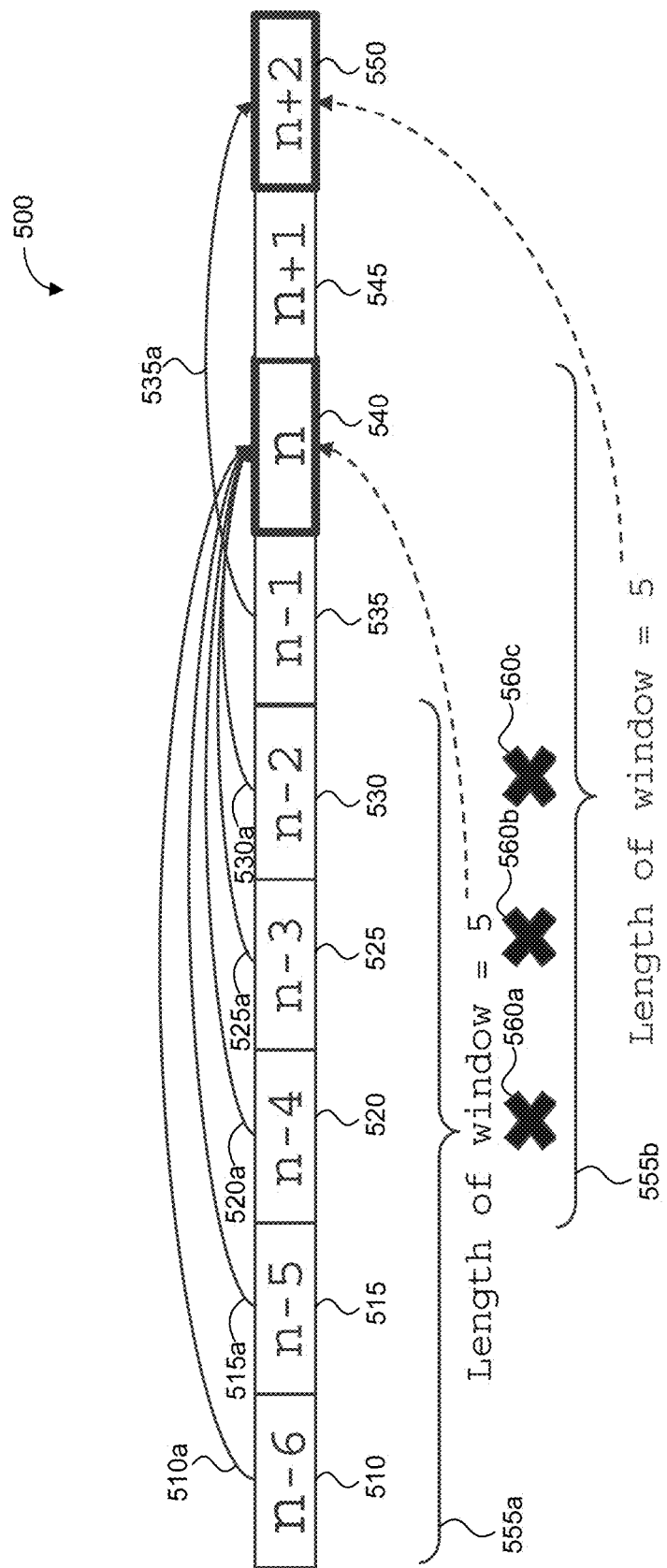
FIG. 5 illustrates an example of window-based HARQ-ACK feedback with overlapped SPS PDSCH transmission occasions for consecutive HARQ-ACK windows, according to some embodiments of the disclosure.

FIG. 5 illustrates example 500 of window-based HARQ-ACK feedback with overlapped SPS PDSCH transmission occasions for consecutive HARQ-ACK windows, according to some embodiments of the disclosure. As a convenience and not a limitation, FIG. 5 may be described with elements of figures in the disclosure. As described above, a corresponding valid UL transmission slot may not be available for all HARQ-ACK feedback corresponding to DL SPS signals as well as SPS release signals. Example 500 can be similar to example 300 of FIG. 3A assuming HARQ-ACK window length set to 5 slots. HARQ-ACK codebook construction can be associated with SPS PDSCH occasions. Example 500 includes DL slots 510, 515, 520, 525, 530, 535, 545, and UL slots 540 and 550. As illustrated, there are no overlaps between HARQ-ACK window 555a and any earlier HARQ-ACK windows (not shown), thus the HARQ-ACK codebook size is determined based on the HARQ-ACK window 555a length (e.g., HARQ-ACK codebook size equals to 5 for PUCCH transmission in slot 540 (e.g., slot n.) UE 110 can generate HARQ-ACK information bits corresponding to slots 510, 515, 520, 525, and 530, and can multiplex the corresponding HARQ-ACK information bits shown as 510a, 515a, 520a, 525a, and 530a that are transmitted in a PUCCH transmission in UL slot 540 (e.g., slot n.) HARQ-ACK window 555a overlaps with HARQ-ACK window 555b that also has a length equal to 5 slots. The following slots overlap both HARQ-ACK window 555a and 555b at slots 520 (e.g., slot n−4), 525 (e.g., slot n−3), and 530 (e.g., slot n−2). Since the HARQ-ACK information bits for those slots are already included in the HARQ-ACK codebook associated with HARQ-ACK window 555a, UE 110 can exclude these overlapped SPS PDSCH occasions (e.g., shown as 560a, 560b, and 560c) and UL slot n within HARQ-ACK windows 555b for HARQ-ACK codebook determination. For example, one HARQ-ACK bit is generated for SPS PDSCH transmission in slot 535 that is transmitted using a PUCCH resource (not shown) in UL slot 550 (e.g., slot n+2.)

Figure 6:
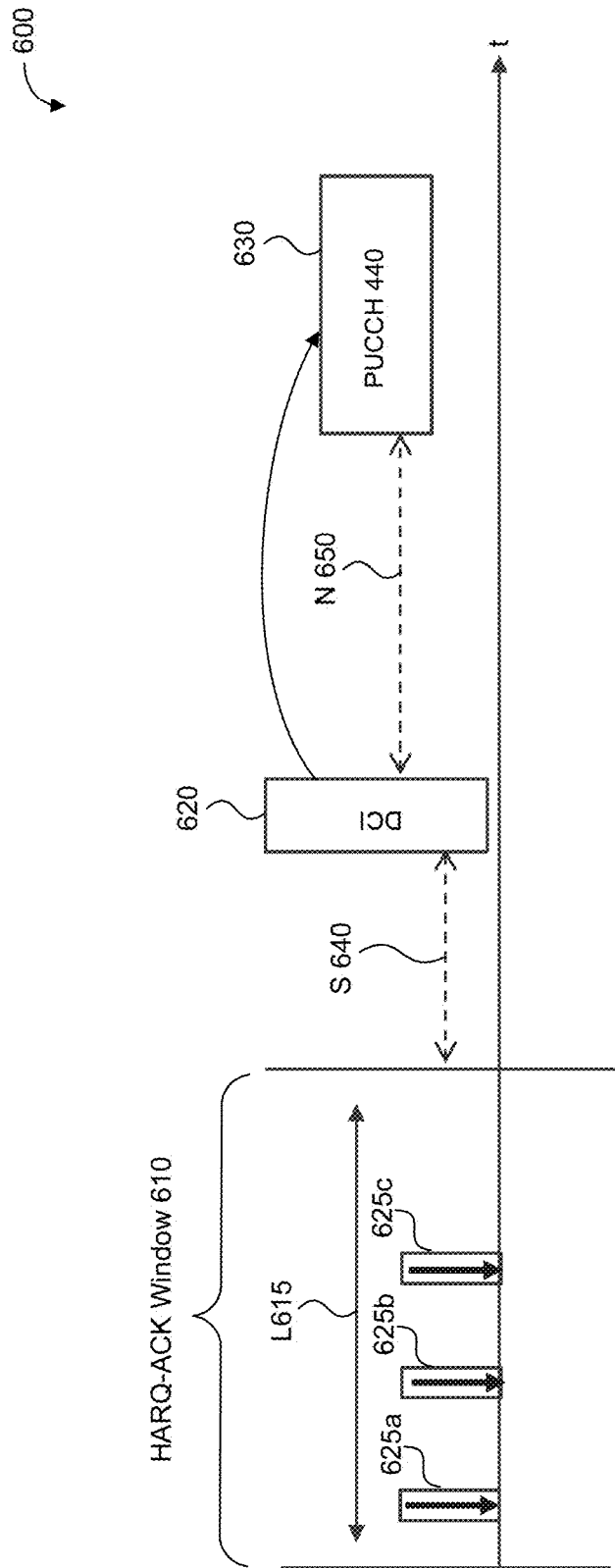
FIG. 6 illustrates an example of a HARQ-ACK bit retransmission including a HARQ-ACK Window Indicator Information Element (IE), according to some embodiments of the disclosure.

FIG. 6 illustrates example 600 of a HARQ-ACK bit retransmission including a HARQ-ACK Window Indicator Information Element (IE), according to some embodiments of the disclosure. As a convenience and not a limitation, FIG. 6 may also be described with elements of other figures in the disclosure. As described above, a corresponding valid UL transmission slot may not be available for all HARQ-ACK feedback corresponding to DL SPS signals as well as SPS release signals, (e.g., UL resource for PUCCH transmission) and consequently, one or more HARQ-ACK information bits may be dropped. In some embodiments, a DCI format may provide a request for a Type-4 HARQ-ACK information for a dropped HARQ-ACK information bit due to unavailable UL resources for PUCCH transmission. For example, a DCI format 0_1/1_1 that schedules PUSCH/PDSCH transmission may be enhanced to trigger a one-shot Type-4 HARQ-ACK codebook by adding a Window Indicator IE. UE 110 can provide HARQ-ACK information bits in response to a DCI format that includes the HARQ-ACK Window Indicator IE for SPS PDSCH transmissions within an associated HARQ-ACK window. The ending symbol of the HARQ-ACK window is S symbols before the first symbol of the DCI format that includes the Window Indicator IE, and the PUCCH transmission is after N symbols from the last symbol of the DCI format. In some embodiments, different N values may be defined corresponding to different numerologies of DCI formats.

Example 600 provides an example of SPS PDSCH transmissions 625a, 625b, and 625c within HARQ-ACK window 610 where the original HARQ-ACK information bits were dropped (e.g., due to unavailable UL resources based on the TDD UL/DL configuration.) DCI format 620 includes a Window Indicator IE that triggers a one-shot Type-4 HARQ-ACK codebook to retransmit the HARQ-ACK information bits that were dropped. HARQ-ACK window 610 is determined by UE 110 in response to DCI format 620 and the values of S and N parameters. For example, UE 110 can provide HARQ-ACK information bits corresponding to SPS PDSCH transmissions 625a, 625b, and 625c within HARQ-ACK window 610 associated with DCI format 620. HARQ-ACK window 610 has a window length, L 615, in symbols. The ending symbol of the HARQ-ACK window 610 is S 640 symbols before the first symbol of DCI format 620 that includes the Window Indicator IE, and PUCCH transmission 630 is after N 650 symbols from the last symbol of DCI format 620. In some embodiments, S 640 and N 650 are signaled as part of a UE capability or may be hard-encoded according to a specification.

Figure 7:
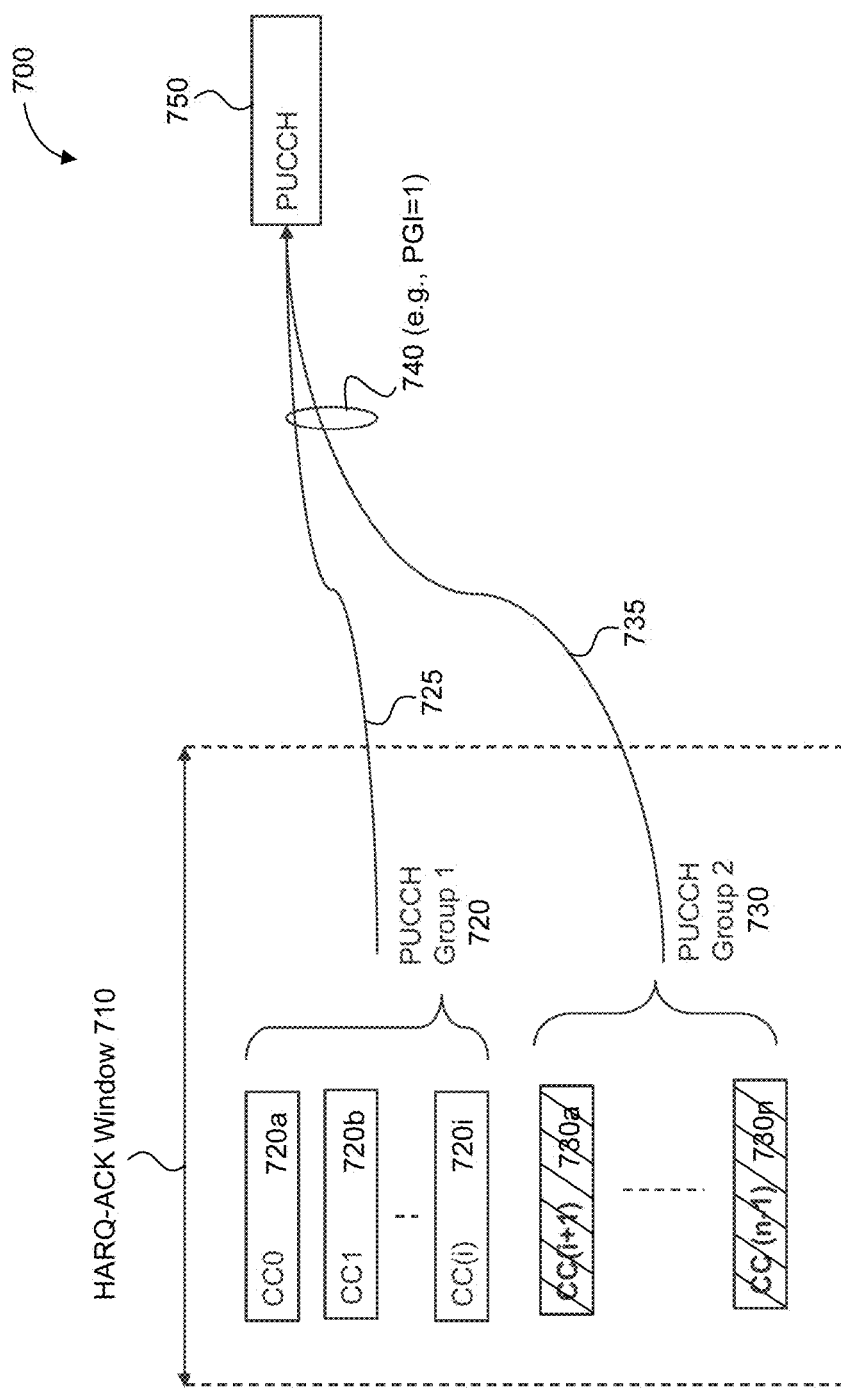
FIG. 7 illustrates an example of a HARQ-ACK bit retransmission including a HARQ-ACK Window Indicator IE with uniform HARQ-ACK window sizes for Carrier Aggregation (CA), according to some embodiments of the disclosure.

FIG. 7 illustrates example 700 of a HARQ-ACK bit retransmission including a HARQ-ACK Window Indicator IE with uniform HARQ-ACK window sizes for Carrier Aggregation (CA), according to some embodiments of the disclosure. As a convenience and not a limitation, FIG. 7 may also be described with elements of other figures in the disclosure. As described above, a corresponding valid UL transmission slot may not be available for all HARQ-ACK feedback corresponding to DL SPS signals as well as SPS release signals, (e.g., UL resource for PUCCH transmission) and consequently, one or more HARQ-ACK information bits may be dropped. Example 700 illustrates a single bit PUCCH Group Indicator, g 740, used to indicate whether one or two PUCCH groups are configured. Example 700 illustrates HARQ-ACK Window 710 with PUCCH Group 1 720 and PUCCH Group 2 730. PUCCH Group 1 720 includes Component Carriers (CCs) 720a, 720b, through 720i, and PUCCH Group 2 730 includes CCs 730a through 730n. For example, when a DCI format is received that includes PUCCH Group Indicator, g 740, where g 740 is set to '0', UE 110 generates HARQ-ACK information bits for CCs in PUCCH Group 1 720. When a DCI format is received that includes PUCCH Group Indicator, g 740, where g 740 is set to '1', UE 110 generates HARQ-ACK information bits for CCs in both PUCCH Group 1 720 and PUCCH Group 2 730. Example 700 illustrates a Type-4 HARQ-ACK codebook triggering for two PUCCH groups where g 740 is equal to '1'. HARQ-ACK information bits corresponding to PUCCH Group 1 720 are transmitted shown as 725 and HARQ-ACK information bits corresponding to PUCCH Group 2 730 are transmitted shown as 735 via PUCCH transmission 750.

In some embodiments two bits are used for the PUCCH Group Indicator, <g(1), g(2)> for one-to-one triggering of a HARQ-ACK feedback for CCs in two PUCCH groups. For example, when g(i) is equal to 1, the request for HARQ-ACK information bits can be generated for SPS PDSCH or PDCCH for SPS PDSCH release in PUCCH group i.

In some embodiments, UE 110 may be provided a set of values for HARQ-ACK window lengths. For example, gNB 120 can transmit a set of values for HARQ-ACK window lengths to UE 110 via: i) a Media Access Control (MAC) Control Element (CE) (see FIG. 8); ii) Dynamic signaling using a scheduling DCI format with HARQ-ACK Window Indicator IE; and/or iii) transmitting a table via higher layer signaling and adding a SPS HARQ-ACK feedback request field to a scheduling DCI format. Each of these approaches are described below.

Figure 8:
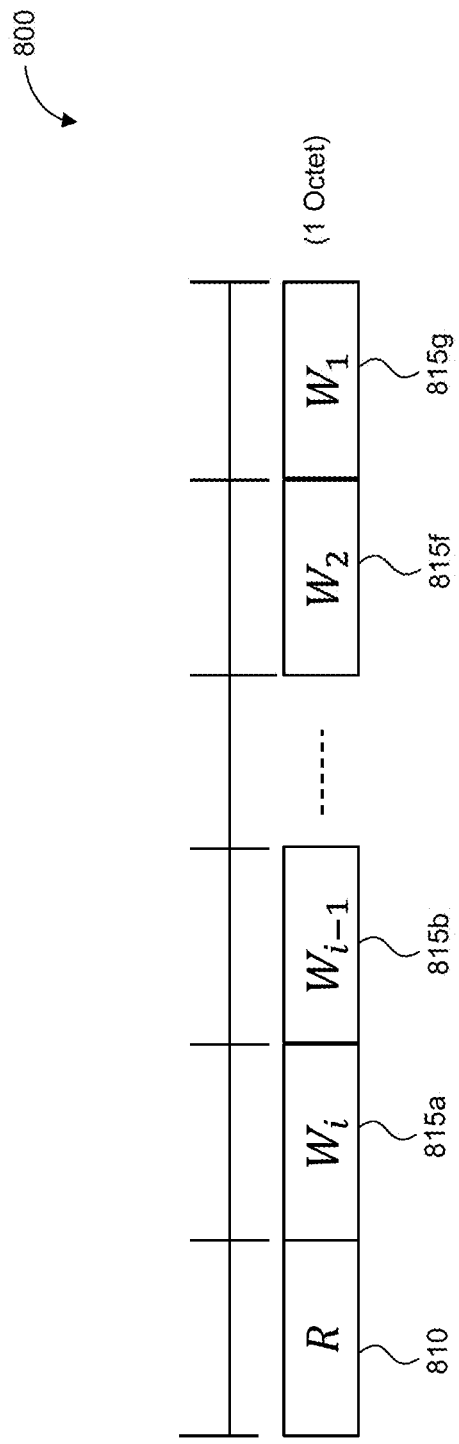
FIG. 8 illustrates an example of a HARQ-ACK bit retransmission including a HARQ-ACK Window Indicator IE with different HARQ-ACK window sizes according to Component Carrier (CC) groups, according to some embodiments of the disclosure.

FIG. 8 illustrates example 800 of a HARQ-ACK bit retransmission including a HARQ-ACK Window Indicator IE with different HARQ-ACK window lengths according to Component Carrier (CC) groups, according to some embodiments of the disclosure. As a convenience and not a limitation, FIG. 8 may also be described with elements of other figures in the disclosure. As described above, a corresponding valid UL transmission slot may not be available for all HARQ-ACK feedback corresponding to DL SPS signals as well as SPS release signals, (e.g., UL resource for PUCCH transmission) and consequently, one or more HARQ-ACK information bits may be dropped. In some embodiments, gNB 120 can transmit a MAC CE to UE 110 to activate a configured HARQ-ACK window length for Type-4 HARQ-ACK codebook transmission for SPS PDSCH transmissions (e.g., corresponding CCs of an SCell). Activating CC group (e.g., CCs of an SCell) HARQ-ACK window lengths via MAC CE can be faster than sending via RRC command UE 110 activates the window length for the corresponding SPS PDSCH transmissions, generates HARQ-ACK information bits, multiplexes the HARQ-ACK information bits into a HARQ-ACK codebook, and transmits the HARQ-ACK codebook to gNB 120.

Example 800 illustrates a MAC CE of a fixed length (e.g., 1 octet) that can be identified by a MAC subhead with Logical Channel ID (LCID) (e.g., the LCID can be hard-encoded in a 3GPP specification.) The MAC CE includes a number of W-fields and R-fields. A $W_i$ field indicates the activation/deactivation status of the configured window length value with index 'i'. The $W_i$ field set to '1' indicates that a Secondary Cell (SCell) that has a window index 'i' is activated. The $W_i$ field set to 0 indicates that a SCell with window index 'i' is deactivated. Example 800 includes Result (R) field 810, and W fields 815a, 815b, through 815g that correspond to different HARQ-ACK window lengths. For example, Window field 815a corresponds to an SCell with window index 'i' and a first length. When UE 110 receives example 800 MAC CE with Window field 815a set to '1', the SCell with window index 'i' will be activated. When Window field 815a is set to '0', the SCell with window index 'i' will be deactivated.

In some embodiments the HARQ-ACK window length is dynamically signaled by gNB 120 to UE 110 in a detected scheduling DCI format with HARQ-ACK Window Indicator IE. The bit width for this IE (e.g., field) can be determined as [log$_2$(l)] where l is the number of lengths configured by higher layer signaling (e.g., RRC command) As an example, when l equals 4, the window length is 2 bits (e.g., [log$_2$(4)=2]. Thus, 4 different window sizes corresponding to a Window Indicator IE bit width of 2-bits in the DCI format are possible. Referring to example 600 of FIG. 6, if gNB 120 determines that HARQ-ACK information bits corresponding to SPS PDSCH transmission 625a, 625b, and 625c have not been received, gNB 120 can dynamically configure HARQ-ACK window 610 length, L 615, to be wide by indicating the two bits in the Window Indicator IE of the DCI format to equal '11'. If gNB 120 determines that only a HARQ-ACK information bit corresponding to SPS PDSCH transmission 625c has not been received, gNB 120 can dynamically configure HARQ-ACK window 610 length, L 615 to be short by indicating the two bits of the Window Indicator IE in the DCI format to be equal to '01'. When UE 110 receives the Window Indicator IE bits, UE 110 determines the corresponding window size associated with the values of the 2 bits of the Window Indicator IE. and determines the HARQ-ACK information bits accordingly. In some embodiments, UE 110 can receive, via a Window Indicator IE of a first DCI format, a HARQ-ACK window length, l, corresponding to the one or more SPS PDSCH transmissions received, where a value of the HARQ-ACK window length, l, can be different in a second Window Indicator IE of a second DCI format.

In some embodiments, gNB 120 can transmit a table to UE 110 via higher layer signaling (e.g., Table 2. SPS HARQ-ACK Request Field) that includes sets of CCs and with corresponding window lengths, and subsequently transmit a scheduling DCI format with a SPS HARQ-ACK feedback request field to indicate for which set of CCs a HARQ-ACK information bit is requested. For example, CCs configured for UE 110 can be divided into a number of CC groups by higher layer signaling (e.g., RRC command) Different HARQ-ACK window lengths can be configured for each CC group (e.g., depending on traffic characteristics). In some embodiments a SPS HARQ-ACK request field can be added into a DCI format where each value of the SPS HARQ-ACK request field can be used to trigger a set of {CC group, window length} pair(s) corresponding to the higher layer set of CC groups configured. Table 2. SPS HARQ-ACK Request Field illustrates different values of SPS HARQ-ACK request field and the different sets of CCs and corresponding window lengths that can be activated. Accordingly, gNB 120 can transmit different values of SPS HARQ-ACK request field to inform UE 110 to perform Type-4 HARQ-ACK codebook construction for SPS PDSCH transmissions for the corresponding CC groups within the indicated HARQ-ACK window lengths.

TABLE 2

SPS HARQ-ACK Request Field

| Value of SPS HARQ-ACK request field | Description |
|---|---|
| 00 | Type-4 HARQ-ACK report is triggered for a 1$^{st}$ set of {CC group, window length} |
| 01 | Type-4 HARQ-ACK report is triggered for a 2$^{nd}$ set of {CC group, window length} |
| 10 | Type-4 HARQ-ACK report is triggered for a 3$^{rd}$ set of {CC group, window length} |
| 11 | Type-4 HARQ-ACK report is triggered for a 4$^{th}$ set of {CC group, window length} |

Figure 9:
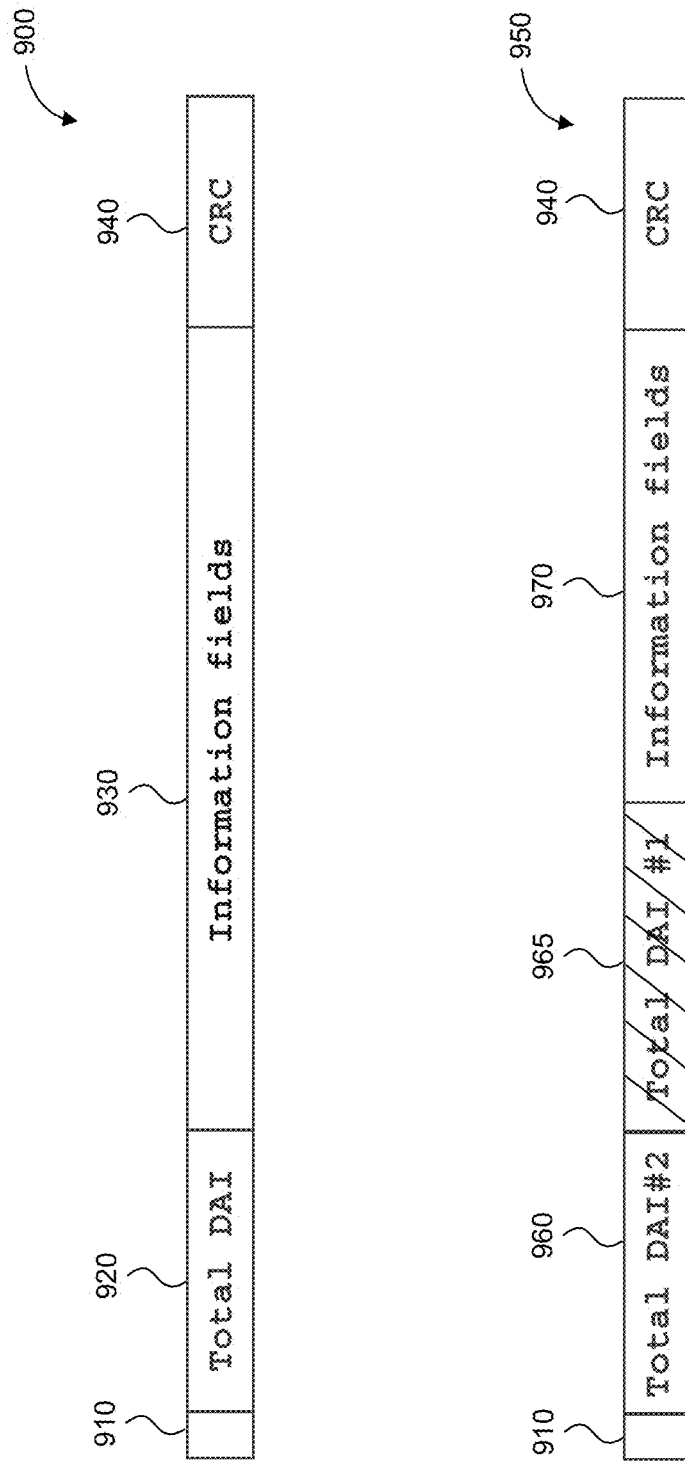
FIG. 9 illustrates examples of a scheduling Downlink Control Information (DCI) format of a dynamic PDSCH transmission for HARQ-ACK retransmission, according to some embodiments of the disclosure.

FIG. 9 illustrates example 900 and example 950 of a scheduling Downlink Control Information (DCI) format of a dynamic PDSCH transmission for HARQ-ACK retransmission, according to some embodiments of the disclosure. As a convenience and not a limitation, FIG. 9 may also be described with elements of other figures in the disclosure. As described above, a corresponding valid UL transmission slot may not be available for all HARQ-ACK feedback corresponding to DL SPS signals as well as SPS release signals, (e.g., UL resource for PUCCH transmission) and consequently, one or more HARQ-ACK information bits may be dropped. For example, one or more HARQ-ACK information bits from PUCCH group 1 720 and/or PUCCH group 2 730 of example 700 of FIG. 7 may be dropped. The gNB 120 may utilize example 900 and/or example 950 of scheduling Downlink Control Information (DCI) formats of a dynamic PDSCH transmission for HARQ-ACK retransmission of those dropped HARQ-ACK information bits.

Example 900 illustrates a Type-1 HARQ-ACK codebook configured for dynamic PDSCH transmission for dropped SPS HARQ-ACK codebook retransmissions. Example 900 can correspond to a variation of example 700 of FIG. 7 where PUCCH Group Indicator, g 740, is set to '0' and UE 110 generates HARQ-ACK information bits for CCs in PUCCH Group 1 720. When the HARQ-ACK information bits for CCs in PUCCH Group 1 720 are missing, gNB 120 can transmit example 900 to UE 110. Example 900 includes HARQ-ACK retransmission triggering field 910, Total DL Assignment Indicator (DAI) field 920, Information fields 930, and cyclic redundancy check (CRC) field 940. Information fields 930 can be defined in Section 7.3.1 of 3GPP TS 38.212.

Example 950 illustrates a Type-2 HARQ-ACK codebook configured for dynamic PDSCH transmission for dropped SPS HARQ-ACK codebook retransmissions. Example 900 can correspond to of example 700 of FIG. 7 where PUCCH Group Indicator, g 740, is set to '1' and UE 110 generates HARQ-ACK information bits for CCs in both PUCCH Group 1 720 and PUCCH Group 2 730. When the HARQ-ACK information bits for CCs in PUCCH Group 1 720 and PUCCH Group 2 730 are missing, gNB 120 can transmit example 950 to UE 110. Example 950 includes HARQ-ACK retransmission triggering field 910, Total DAI #2 field 960, Total DAI #1 field 965, Information fields 970, and CRC field 940. For example, Total DAI #2 field 960 can correspond to PUCCH group 1 720 of example 700 and Total DAI #1 field 965 can pertain to PUCCH Group 2 730 of example 700. Information fields 970 can be defined in Section 7.3.1 of 3GPP TS 38.212.

HARQ-ACK retransmission triggering field 910 allows gNB 120 to indicate whether or not to trigger a HARQ-ACK retransmission for SPS PDSCH transmission in conjunction with HARQ-ACK bits for dynamically scheduled PDSCH transmissions. The HARQ-ACK information bits can be indexed in a predefined order (e.g., ascending or descending order) of occasions of SPS PDSCH transmissions or PDCCH transmissions for SPS PDSCH release in the time domain within the window signaled by Total DAI field (e.g., Total DAI field 920, Total DAI #2 field 960, Total DAI #1 field 965) independent of whether or not UE 110 has transmitted the HARQ-ACK information bits for the corresponding SPS PDSCH transmissions using an earlier PUCCH transmission occasion.

There are at least two options for the meaning of a Total DAI field (e.g., Total DAI field 920, Total DAI #2 field 960, Total DAI #1 field 965) that are described below and further illustrated in FIG. 10. In a first option, a Total DAI field can denote the accumulated number of HARQ-ACK information bits that are to be retransmitted. For example, the Total DAI field can indicate a number of deferred HARQ-ACK information bits (e.g., retransmitted HARQ-ACK information bits) for SPS PDSCH transmissions or PDCCH transmissions for SPS PDSCH release. UE 110 can use the PUCCH transmission occasion to carry based on the PDSCH processing timeline. In a second option, a Total DAI field can denote the accumulated number of HARQ-ACK codebooks to be retransmitted. For example, the Total DAI field can indicate a number of deferred HARQ-ACK codebooks (e.g., retransmitted HARQ-ACK codebooks) for SPS PDSCH transmissions or PDCCH transmissions for SPS PDSCH release. UE 110 can use the PUCCH transmission occasion to carry based on the PDSCH processing timeline.

Figure 10:
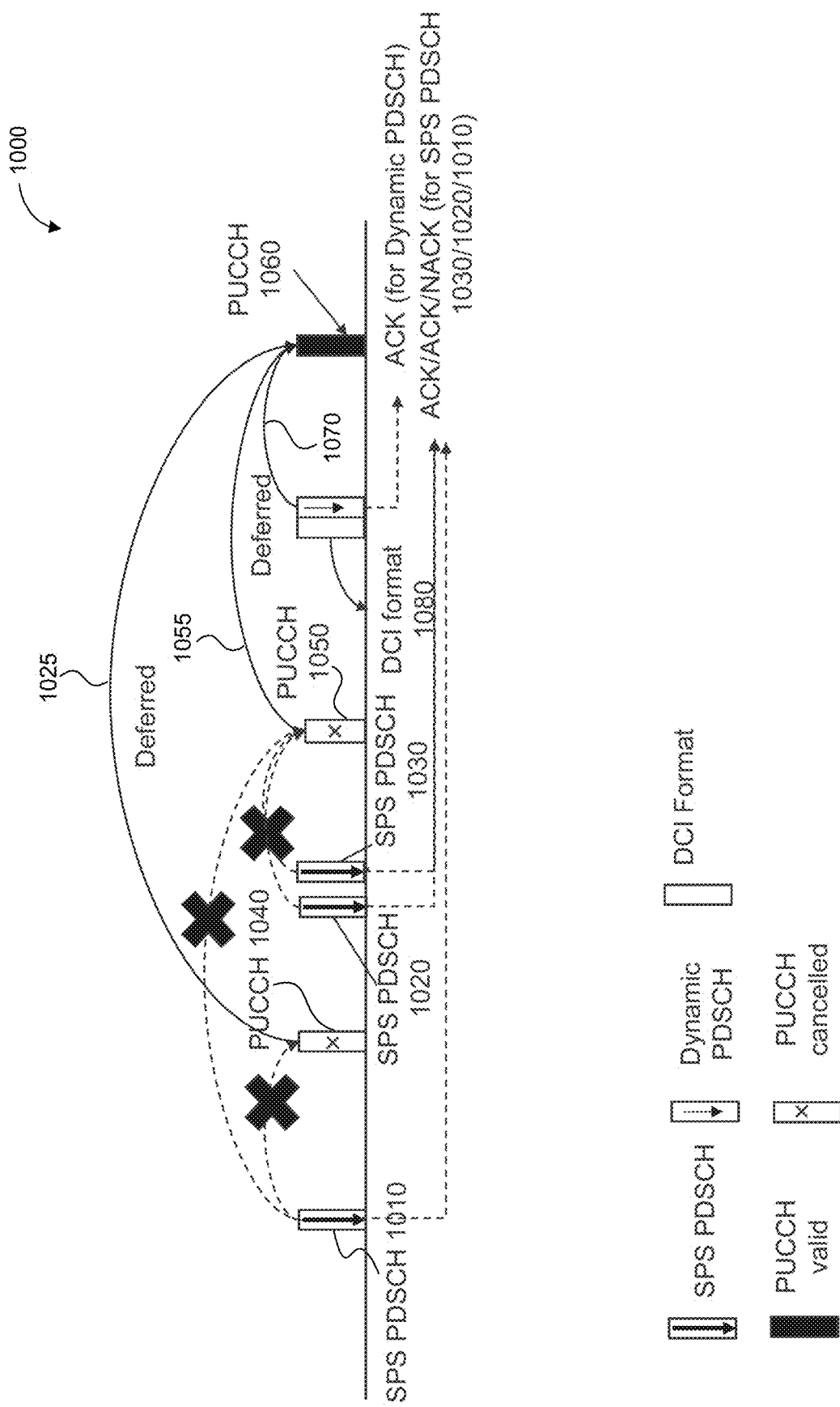
FIG. 10 illustrates an example of HARQ-ACK retransmission including a scheduling DCI format of a dynamic PDSCH transmission, according to some embodiments of the disclosure.

FIG. 10 illustrates example 1000 of HARQ-ACK retransmission including a scheduling DCI format of a dynamic PDSCH transmission, according to some embodiments of the disclosure. As a convenience and not a limitation, FIG. 10 may also be described with elements of other figures in the disclosure. Example 1000 illustrates an accumulative HARQ-ACK codebook construction to accommodate two deferred HARQ-ACK information bits 1025 and 1055 (e.g., retransmitted HARQ-ACK information bits) for SPS PDSCH transmissions 1010, 1020, and 1030. The shown by the large "X" indicates failed HARQ-ACK feedbacks (e.g., due to resources being configured as DL slots by a TDD UL/DL configuration.) In some embodiments, UE 110 can be configured with an offset value, k, via higher layer signaling (e.g., RRC command) or via an activation DCI format (e.g., to activate an SPS PDSCH transmission.)

In some embodiments, gNB 120 transmits a HARQ-ACK retransmission utilizing a scheduling DCI format 1080 of a dynamic PDSCH transmission (e.g., DCI format example 900 or 950) according to option 1 or option 2 where HARQ-ACK retransmission triggering field 910 is triggered (e.g., set to '1'.) Based on example 900 or 950 received, UE 110 can schedule the dynamic PDSCH transmission with a HARQ-ACK information bits shown as 1070 on PUCCH transmission 1060 based on the offset value, k. In addition, UE 110 generates HARQ-ACK information bits (e.g., HARQ-ACK information bits previously dropped for SPS PDSCH transmissions 1010, 1020, and 1030 for retransmission). UE 110 can append the generated HARQ-ACK information bits shown as 1025 and 1055, to the end of a HARQ-ACK codebook associated with dynamic PDSCH transmission (e.g., append HARQ-ACK information bits 1025 and 1055 after 1070.)

When option 1 is selected, gNB 120 transmits example 900 or 950 to UE 110 where a Total DAI field (e.g., Total DAI field 920, Total DAI #2 field 960, and/or Total DAI #1 field 965) may be set to a value of '3' representing three HARQ-ACK bits for SPS PDSCH transmissions 1010, 1020, and 1030. When option 2 is selected, gNB 120 transmits example 900 or 950 to UE 110 where a Total DAI field (e.g., Total DAI field 920, Total DAI #2 field 960, and/or Total DAI #1 field 965) may be set to a value of '2' representing two cancelled PUCCH occasions 1040 and 1050 or 2 SPS HARQ-ACK codebooks.

Figure 11:
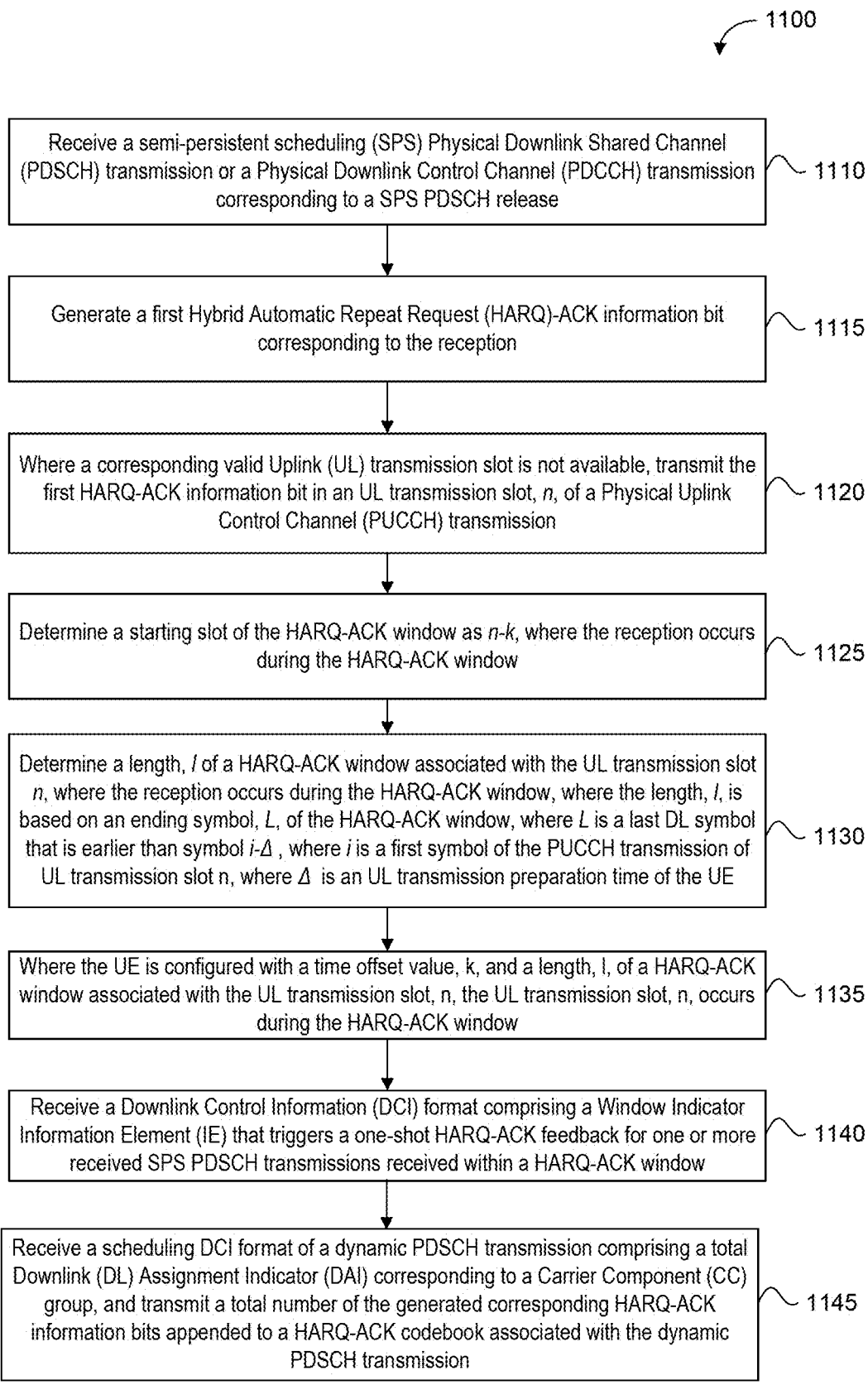
FIG. 11 illustrates an example method for a user equipment (UE) supporting enhanced HARQ-ACK feedback, according to some embodiments of the disclosure.

FIG. 11 illustrates example method 1100 for a UE supporting enhanced HARQ-ACK feedback, according to some embodiments of the disclosure. As a convenience and not a limitation, FIG. 11 may also be described with elements of other figures in the disclosure. For example, method 1100 may be performed by a UE such as UE 110 of FIG. 1, system 200 of FIG. 2, or system 1300 of FIG. 13. As described above, a corresponding valid UL transmission slot may not be available for all HARQ-ACK feedback corresponding to DL SPS signals as well as SPS release signals, (e.g., UL resource for PUCCH transmission) and consequently, one or more HARQ-ACK information bits may be dropped.

At 1110, UE 110 can receive a SPS PDSCH transmission or a PDCCH transmission corresponding to a SPS PDSCH release.

At 1115, UE 110 can generate a first HARQ-ACK information bit corresponding to the reception.

At 1120, where a corresponding valid Uplink (UL) transmission slot is not available, UE 110 can transmit the first HARQ-ACK information bit in an UL transmission slot, n, of a Physical Uplink Control Channel (PUCCH) transmission.

At 1125, UE 110 can determine a starting slot of the HARQ-ACK window as n−k, where the reception occurs during the HARQ-ACK window, where the UE is configured with an offset value, k, and a length, l, of a HARQ-ACK window associated with the UL transmission slot n.

At 1130, UE 110 can determine a length, l, of a HARQ-ACK window associated with the UL transmission slot n, where the reception occurs during the HARQ-ACK window, where the length, l, is based on an ending symbol, L, of the HARQ-ACK window, where L is a last DL symbol that is earlier than symbol i−$\Delta$, where i is a first symbol of the PUCCH transmission of UL transmission slot n, where $\Delta$ is an UL transmission preparation time of the UE. UE 110 can determine a starting slot of the HARQ-ACK window as n−k.

At 1135, where the UE is configured with a time offset value, k, and a length, l, of a HARQ-ACK window associated with the UL transmission slot, n, the UL transmission slot n, occurs during the HARQ-ACK window. The offset value, k, indicates a time between an end symbol, M, of the SPS PDSCH transmission or of the PDCCH transmission corresponding to the SPS PDSCH release, and a start of the HARQ-ACK window.

In some embodiments, the transmission of the first HARQ-ACK information bit in the UL transmission slot n, is an earliest PUCCH transmission or an earliest Physical Uplink Shared Channel (PUSCH) transmission in the HARQ-ACK window, and wherein the HARQ-ACK window begins at a slot after M+k. In some embodiments, UE 110 can receive a table via RRC signaling, wherein each row comprises an index and a corresponding combination of an offset value, k, value and a length, l, value, and receive an SPS DCI format on a per SPS configuration basis, including a first index corresponding to a first combination of k value and l value. Each row of the table can correspond to a different latency requirement.

At 1140, UE 110 can receive a DCI format comprising a Window Indicator IE that triggers a one-shot HARQ-ACK feedback for one or more second SPS PDSCH transmissions received within a second HARQ-ACK window. The second HARQ-ACK window corresponds to the DCI format, where original HARQ-ACK information bits corresponding to the one or more second SPS PDSCH transmissions were dropped. The the Window Indicator IE includes: an S value and an N value, where the S value indicates a number of symbols between an ending symbol of the HARQ-ACK window and a first symbol of the DCI format, and the N value indicates a number of symbols between a last symbol of the DCI format and a first symbol of a second PUCCH transmission of a second UL transmission slot. UE 110 can transmit second HARQ-ACK information bits corresponding to the one or more second SPS PDSCH transmissions in the second PUCCH transmission of the second UL transmission slot.

In some embodiments, UE is configured with a HARQ-ACK window length, L, in symbols, via higher layer signaling comprising Radio Resource Control (RRC) signaling, where the HARQ-ACK window length, L, is applied to: activated Component Carriers (CCs) corresponding to the one or more second SPS PDSCH transmissions, and where the UE is configured with one PUCCH group, the DCI format comprises a single bit PUCCH Group Indicator (g) whose value equals '0'. UE 110 can generate HARQ-ACK information bits for the CCs in the PUCCH group.

In some embodiments, UE 110 is configured with a HARQ-ACK window length, L, in symbols, via higher layer signaling comprising Radio Resource Control (RRC) signaling, where the HARQ-ACK window length, L, is applied to: activated Component Carriers (CCs) corresponding to the one or more second SPS PDSCH transmissions, and UE 110 is configured with two PUCCH groups for Carrier Aggregation (CA). The DCI format includes a single bit PUCCH Group Indicator (g) whose value equals '1', and UE 110 can generate HARQ-ACK information bits for the CCs in the two PUCCH groups.

In some embodiments, UE 110 is configured with a HARQ-ACK window length, L, in symbols, via higher layer signaling comprising Radio Resource Control (RRC) signaling, where the HARQ-ACK window length, L, is applied to: activated Component Carriers (CCs) with SPS PDSCH transmission configurations, corresponding to the one or more second SPS PDSCH transmissions received. UE 110 can be configured with two PUCCH groups of the activated CCs for Carrier Aggregation (CA), the received DCI format comprises a two bit PUCCH Group Indicator (PGI), <g(1), g(2)>, wherein g(1) represents CC group 1, and g(2) represents CC group 2. When g(1) equals '1' UE 110 can generate HARQ-ACK information bits including the first HARQ-ACK information bit, for the CCs in group 1. When g(2) equals '1' UE 110 can generate HARQ-ACK information bits for the CCs in group 2.

In some embodiments, UE 110 can receive a MAC CE including an active HARQ-ACK window length, corresponding to a $W_i$ field, wherein index, i, indicates a particular HARQ-ACK window length corresponding to the one or more second SPS PDSCH transmissions received. UE 110 can also receive, via the Window Indicator IE, a HARQ-ACK window length, l, corresponding to the one or more second SPS PDSCH transmissions received, where a value of the HARQ-ACK window length, l, can be different in a second Window Indicator IE of a second DCI format.

In some embodiments, the DCI format includes a first SPS HARQ-ACK feedback request field corresponding to a set of a first CC group and a first HARQ-ACK window length, UE 110 can perform a first HARQ-ACK codebook construction for the one or more SPS PDSCH transmissions received corresponding to the set of the first CC group over the first HARQ-ACK window length.

In some embodiments, subsequent to the transmission of the first HARQ-ACK information bit, UE 110 can receive a scheduling DCI format of a dynamic PDSCH transmission comprising a total DAI corresponding to a CC group, and generate HARQ-ACK information bits corresponding to the CC group. UE 110 can transmit a total number of the HARQ-ACK information bits appended to a HARQ-ACK codebook associated with the dynamic PDSCH transmission.

At 1145, UE 110 can receive a scheduling DCI format of a dynamic PDSCH transmission comprising a total DAI corresponding to a CC group, and transmit a total number of the generated corresponding HARQ-ACK information bits appended to a HARQ-ACK codebook associated with the dynamic PDSCH transmission.

Figure 12:
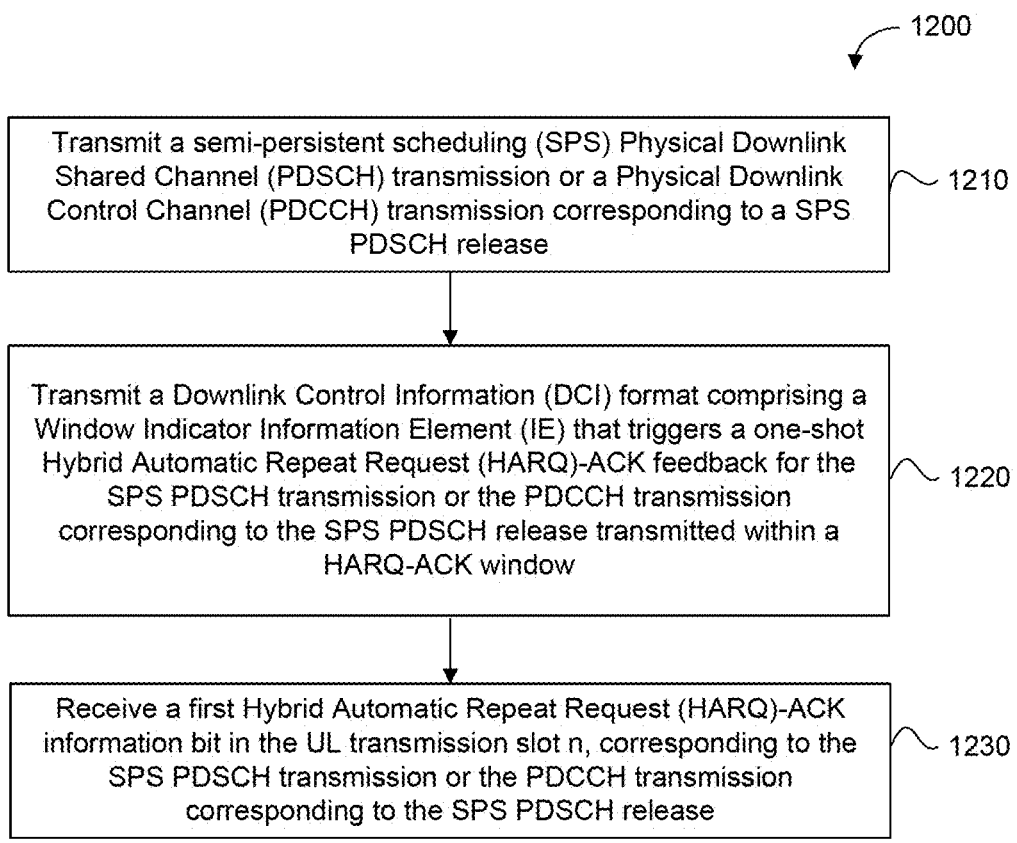
FIG. 12 illustrates an example method for a 5G Node B (gNB) supporting enhanced HARQ-ACK feedback, according to some embodiments of the disclosure.

FIG. 12 illustrates an example method for a gNB supporting enhanced HARQ-ACK feedback, according to some embodiments of the disclosure. As a convenience and not a limitation, FIG. 12 may also be described with elements of other figures in the disclosure. For example, method 1200 may be performed by a gNB such as gNB 120 of FIG. 1, system 200 of FIG. 2, or system 1300 of FIG. 13. As described above, a corresponding valid UL transmission slot may not be available for all HARQ-ACK feedback corresponding to DL SPS signals as well as SPS release signals, (e.g., UL resource for PUCCH transmission) and consequently, one or more HARQ-ACK information bits may be dropped.

At 1210, gNB 120 can transmit a SPS PDSCH transmission or a PDCCH transmission corresponding to a SPS PDSCH release.

At 1220, gNB 120 can transmit a DCI format comprising a Window Indicator IE that triggers a one-shot HARQ-ACK feedback for the SPS PDSCH transmission or the PDCCH transmission corresponding to the SPS PDSCH release transmitted within a HARQ-ACK window.

At 1230, gNB can receive a first HARQ-ACK information bit in the UL transmission slot n, corresponding to the SPS PDSCH transmission or the PDCCH transmission corresponding to the SPS PDSCH release.

Figure 13:
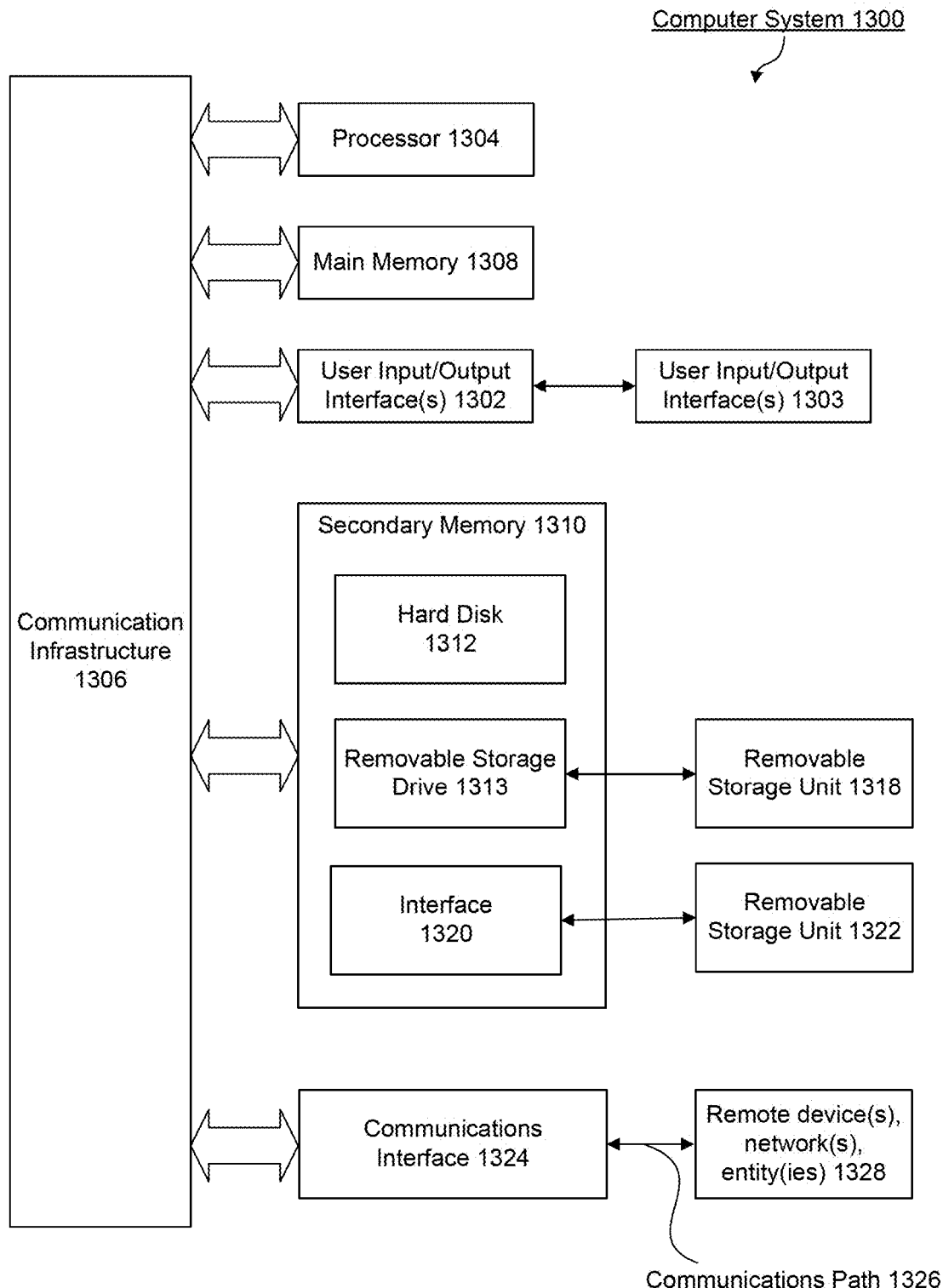
FIG. 13 illustrates an example computer system for implementing some embodiments or portion(s) thereof.

Various embodiments can be implemented, for example, using one or more well-known computer systems, such as computer system 1300 shown in FIG. 13. Computer system 1300 can be any well-known computer capable of performing the functions described herein. For example, and without limitation, system 200 of FIG. 2, method 1100 of FIG. 11, and method 1200 of FIG. 12 (and/or other apparatuses and/or components shown in the figures) may be implemented using computer system 1300, or portions thereof.

Computer system 1300 includes one or more processors (also called central processing units, or CPUs), such as a processor 1304. Processor 1304 is connected to a communication infrastructure 1306 that can be a bus. One or more processors 1304 may each be a graphics processing unit (GPU). In an embodiment, a GPU is a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 1300 also includes user input/output device(s) 1303, such as monitors, keyboards, pointing devices, etc., that communicate with communication infrastructure 1306 through user input/output interface(s) 1302. Computer system 1300 also includes a main or primary memory 1308, such as random access memory (RAM). Main memory 1308 may include one or more levels of cache. Main memory 1308 has stored therein control logic (e.g., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 1314 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/ any other computer data storage device. Removable storage drive 1314 reads from and/or writes to removable storage unit 1318 in a well-known manner.

According to some embodiments, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

The operations in the preceding embodiments can be implemented in a wide variety of configurations and architectures. Therefore, some or all of the operations in the preceding embodiments may be performed in hardware, in software or both. In some embodiments, a tangible, non-transitory apparatus or article of manufacture includes a tangible, non-transitory computer useable or readable medium having control logic (software) stored thereon is also referred to herein as a computer program product or program storage device. This includes, but is not limited to, computer system 1300, main memory 1308, secondary memory 1310 and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use embodiments of the disclosure using data processing devices, computer systems and/or computer architectures other than that shown in FIG. 13. In particular, embodiments may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative embodiments may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the disclosure should not be limited by any of the above-described exemplary embodiments, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE), comprising:
a transceiver configured to operate in a wireless network;
a processor coupled to the transceiver, configured to:
receive a semi-persistent scheduling (SPS) Physical Downlink Shared Channel (PDSCH) transmission or a Physical Downlink Control Channel (PDCCH) transmission corresponding to an SPS PDSCH release;
generate a first Hybrid Automatic Repeat Request (HARQ)-ACK information bit corresponding to reception of the SPS PDSCH transmission or the PDCCH transmission, wherein a valid Uplink (UL) transmission slot corresponding to the reception is not available;
transmit, using the transceiver, the first HARQ-ACK information bit in a Physical Uplink Control Channel (PUCCH) transmission of a UL transmission slot n, wherein n is an integer;
receive a Downlink Control Information (DCI) format comprising a Window Indicator Information Element (IE); and
based on the DCI format, trigger a one-shot HARQ-ACK feedback for one or more second SPS PDSCH transmissions received within a first HARQ-ACK window corresponding to the DCI format, wherein original HARQ-ACK information bits corresponding to the one or more second SPS PDSCH transmissions were deferred due to an unavailable UL transmission slot.

2. The UE of claim 1, wherein the UE is configured with an offset value, k, and a length, l, of a second HARQ-ACK window associated with the UL transmission slot n, the processor is further configured to:
determine a starting slot of the second HARQ-ACK window as n−k, wherein the reception of the SPS PDSCH transmission or the PDCCH transmission corresponding to the SPS PDSCH release occurs during the second HARQ-ACK window.

3. The UE of claim 2, wherein the UE is configured with the offset value, k, via higher layer signaling comprising Radio Resource Control (RRC) signaling or via an activation DCI format that activates the SPS PDSCH transmission.

4. The UE of claim 1, wherein the UE is configured with an offset value, k, the processor is further configured to:
determine a length, l, of a second HARQ-ACK window associated with the UL transmission slot n, wherein the reception of the SPS PDSCH transmission or the PDCCH transmission corresponding to the SPS PDSCH release occurs during the second HARQ-ACK window, wherein the length, l, is based on an ending symbol, L, of the second HARQ-ACK window, where L is a last DL symbol that is earlier than symbol i-$\Delta$, where i is a first symbol of the PUCCH transmission of the UL transmission slot n, where $\Delta$ is an UL transmission preparation time of the UE; and
determine a starting slot of the second HARQ-ACK window as n−k.

5. The UE of claim 1, wherein the UE is configured with an offset value, k, and a length, l, of a second HARQ-ACK window associated with the UL transmission slot n,
   wherein the offset value, k, indicates a time between an end symbol, M, of the SPS PDSCH transmission or of the PDCCH transmission corresponding to the SPS PDSCH release, and a start of the second HARQ-ACK window, and
   wherein the UL transmission slot n, occurs during the second HARQ-ACK window.

6. The UE of claim 5, wherein the UE is configured with k and l via higher layer signaling comprising different Radio Resource Control (RRC) signaling parameters.

7. The UE of claim 5, wherein the transmission of the first HARQ-ACK information bit in the UL transmission slot n, is an earliest PUCCH transmission or an earliest Physical Uplink Shared Channel (PUSCH) transmission in the second HARQ-ACK window, and wherein the HARQ-ACK window begins at a slot after M+k.

8. The UE of claim 5, wherein the processor is further configured to:
   receive a table via Radio Resource Control (RRC) signaling, wherein each row comprises an index and a corresponding combination of the offset value, k, and the length, l; and
   receive an SPS activation DCI format on a per SPS configuration basis, comprising a first index corresponding to a first combination of k value and l value.

9. The UE of claim 8, wherein each row of the table corresponds to a different latency requirement.

10. The UE of claim 1,
    wherein the Window Indicator IE comprises: an S value and an N value, wherein the S value indicates a number of symbols between an ending symbol of the first HARQ-ACK window and a first symbol of the DCI format, and wherein the N value indicates a number of symbols between a last symbol of the DCI format and a first symbol of a second PUCCH transmission of a second UL transmission slot, and the processor is further configured to:
    transmit one or more of the original HARQ-ACK information bits corresponding to the one or more second SPS PDSCH transmissions in the second PUCCH transmission of the second UL transmission slot.

11. The UE of claim 10, configured with a HARQ-ACK window length, L, in symbols, via higher layer signaling comprising Radio Resource Control (RRC) signaling,
    wherein the HARQ-ACK window length, L, is applied to: activated Component Carriers (CCs) corresponding to the one or more second SPS PDSCH transmissions, and
    wherein the UE is configured with one PUCCH group, the DCI format comprises a single bit PUCCH Group Indicator (g), the processor is configured to: generate one or more of the original HARQ-ACK information bits for the CCs in the one PUCCH group.

12. The UE of claim 10, configured with a HARQ-ACK window length, L, in symbols, via higher layer signaling comprising Radio Resource Control (RRC) signaling,
    wherein the HARQ-ACK window length, L, is applied to: activated Component Carriers (CCs) corresponding to the one or more second SPS PDSCH transmissions, and
    wherein the UE is configured with two PUCCH groups for Carrier Aggregation (CA), the DCI format comprises a single bit PUCCH Group Indicator (g), the processor is configured to: generate one or more of the original HARQ-ACK information bits for the CCs in the two PUCCH groups; and
    wherein the UE is configured with a PUCCH group, the processor is configured to: generate one or more of the original HARQ-ACK information bits for the CCs in the PUCCH group.

13. The UE of claim 10, configured with a HARQ-ACK window length, L, in symbols, via higher layer signaling comprising Radio Resource Control (RRC) signaling,
    wherein the HARQ-ACK window length, L, is applied to: activated Component Carriers (CCs) with SPS PDSCH transmission configurations, corresponding to the one or more second SPS PDSCH transmissions received,
    wherein the UE is configured with two PUCCH groups of the activated CCs for Carrier Aggregation (CA), the DCI format comprises a two bit PUCCH Group Indicator (PGI), $<g(1), g(2)>$, wherein $g(1)$ represents CC group 1, and $g(2)$ represents CC group 2,
    wherein the processor is configured to: generate one or more original HARQ-ACK information bits for the CCs in group 1; and
    wherein the processor is configured to: generate one or more original HARQ-ACK information bits for the CCs in group 2.

14. The UE of claim 10, wherein the processor is further configured to:
    receive a Medium Access Control (MAC) Control Element (CE) comprising an active HARQ-ACK window length, corresponding to a $W_i$ field, wherein index, i, indicates a particular HARQ-ACK window length corresponding to the one or more second SPS PDSCH transmissions received.

15. The UE of claim 10, wherein the processor is further configured to:
    receive, via the Window Indicator IE, a HARQ-ACK window length, l, corresponding to the one or more second SPS PDSCH transmissions received, wherein a value of the HARQ-ACK window length, l, is different in a second Window Indicator IE of a second DCI format.

16. The UE of claim 10, wherein the DCI format comprises a first SPS HARQ-ACK feedback request field corresponding to a set of combinations of a first Carrier Component (CC) group and a first HARQ-ACK window length, the processor is further configured to: perform a first HARQ-ACK codebook construction for the one or more SPS PDSCH transmissions received corresponding to the set of the first CC group over the first HARQ-ACK window length.

17. A base station (BS), comprising:
    a transceiver configured to operate in a wireless network; and
    a processor coupled to the transceiver, configured to:
      transmit, using the transceiver, a semi-persistent scheduling (SPS) Physical Downlink Shared Channel (PDSCH) transmission or a Physical Downlink Control Channel (PDCCH) transmission corresponding to an SPS PDSCH release;
      transmit, using the transceiver, a Downlink Control Information (DCI) format comprising a Window Indicator Information Element (IE) that triggers a one-shot Hybrid Automatic Repeat Request (HARQ)-ACK feedback for the SPS PDSCH transmission or the PDCCH transmission corresponding to the SPS PDSCH release,
      wherein the SPS PDSCH transmission or the PDCCH transmission corresponding to the SPS PDSCH release is transmitted within a HARQ-ACK window, and wherein the Window Indicator IE comprises: an S value and an N value, wherein the S value indicates a number of symbols between an ending symbol of the HARQ-ACK window and a first symbol of the DCI format, and wherein the N value indicates a number of symbols between a last symbol of the DCI format and a first symbol of a Physical Uplink Control Channel (PUCCH) transmission of a UL transmission slot n, wherein n is an integer; and receive a first HARQ-ACK information bit in the UL transmission slot n, corresponding to the SPS PDSCH transmission or the PDCCH transmission corresponding to the SPS PDSCH release.

18. A method for a user equipment (UE), comprising:

receiving a semi-persistent scheduling (SPS) Physical Downlink Shared Channel (PDSCH) transmission or a Physical Downlink Control Channel (PDCCH) transmission corresponding to an SPS PDSCH release;

generating a first Hybrid Automatic Repeat Request (HARQ)-ACK information bit corresponding to reception of the SPS PDSCH transmission or the PDCCH transmission, wherein a corresponding valid Uplink (UL) transmission slot is not available;

receiving a Downlink Control Information (DCI) format comprising a Window Indicator Information Element (IE) that triggers a one-shot HARQ-ACK feedback for the SPS PDSCH transmission or the PDCCH transmission corresponding to the SPS PDSCH release, wherein the Window Indicator IE comprises: an S value and an N value, wherein the S value indicates a number of symbols between an ending symbol of a HARQ-ACK window and a first symbol of the DCI format, and wherein the N value indicates a number of symbols between a last symbol of the DCI format and a first symbol of the PUCCH transmission of the UL transmission slot n, wherein n is an integer;

generating a second HARQ-ACK information bit corresponding to the Window Indicator IE; and transmitting the second HARQ-ACK information bit in a UL transmission slot n of a Physical Uplink Control Channel (PUCCH) transmission corresponding to the Window Indicator IE.

19. The method of claim 18, wherein UE is configured with a HARQ-ACK window length, L, in symbols, via higher layer signaling comprising Radio Resource Control (RRC) signaling, wherein the HARQ-ACK window length, L, is applied to: activated Component Carriers (CCs) corresponding to the SPS PDSCH transmission or the PDCCH transmission corresponding to the SPS PDSCH release received, and wherein the UE is configured with one PUCCH group, the DCI format comprises a single bit PUCCH Group Indicator (g), generating HARQ-ACK information bits for the CCs in the one PUCCH group.

20. The method of claim 18, wherein the UE is configured with an offset value, k, the method further comprises:

determining a length, l, of a HARQ-ACK window associated with the UL transmission slot n, wherein the reception occurs during the HARQ-ACK window, wherein the length, l, is based on an ending symbol, L, of the HARQ-ACK window, where L is a last DL symbol that is earlier than symbol i-$\Delta$, where i is a first symbol of the PUCCH transmission of the UL transmission slot n, where $\Delta$ is an UL transmission preparation time of the UE; and determining a starting slot of the HARQ-ACK window as n–k.

* * * * *